US005864362A

United States Patent [19]
Cutler

[11] Patent Number: 5,864,362
[45] Date of Patent: Jan. 26, 1999

[54] HIGH SPEED SCANNER FOR READING LATENT IMAGES IN STORAGE PHOSPHORS

[75] Inventor: Gregory M. Cutler, Cupertino, Calif.

[73] Assignee: Hewlett-Packard Company, Palo Alto, Calif.

[21] Appl. No.: 703,717

[22] Filed: Aug. 27, 1996

[51] Int. Cl.⁶ .................................................. H04N 5/253
[52] U.S. Cl. ............................................. 348/96; 348/97
[58] Field of Search .................................. 348/97, 61, 96, 348/98–112, 384, 262, 264, 266, 180, 294; 358/474, 479, 473, 471, 448–456; 356/359; 386/127, 128, 42; 250/201.1, 330, 484.4; H04N 3/36

[56] References Cited

U.S. PATENT DOCUMENTS

| | | | |
|---|---|---|---|
| 2,482,813 | 9/1949 | Urbach | 250/484.4 |
| 5,065,023 | 11/1991 | Lindmayer | 250/484.4 |
| 5,272,518 | 12/1993 | Vincent | 348/180 |
| 5,313,298 | 5/1994 | Meeker | 348/384 |
| 5,369,497 | 11/1994 | Allen et al. | 358/298 |
| 5,387,788 | 2/1995 | Miller et al. | 250/201.1 |
| 5,555,471 | 9/1996 | Xu et al. | 356/359 |
| 5,565,914 | 10/1996 | Motta | 348/294 |

*Primary Examiner*—Tommy P. Chin
*Assistant Examiner*—Y. Lee
*Attorney, Agent, or Firm*—Ian Hardcastle

[57] ABSTRACT

Picture signals representing a stored image stored in an image storage medium are generated. A stimulation beam having a monotonic non-uniform intensity distribution and a sensor array including a rectangular array of pixels each generating an image signal are provided. Each pixel generates in response to light. An image of an object area of the stored image is formed on the sensor array to define in the object area a fixel corresponding to each pixel of the sensor array. The object area is a small fraction of the area of the stored image. The stored image is stimulated by forming a stimulation spot substantially centered in the object area of the stored image using the stimulation beam. The stored image is scanned with the object area and the stimulation spot. This defines fixels in the stored image and generates a picture signal for each fixel. The picture signal for each fixel represents the accumulation of light emitted by the fixel in response to the stimulation spot. In scanning the stored image, the position of the object area and stimulation spot is successively changed relative to the stored image along a first axis to scan a slice of the stored image. Successive slices of the stored image are scanned along a second axis, substantially orthogonal to the first axis. At each position of the object area in the stored image, the sensor array is controlled to generate an image signal in response to the light emitted by each fixel in the object area. Finally, for each fixel in the stored image, all the image signals generated by the sensor array are accumulated to generate the picture signal for the fixel.

20 Claims, 8 Drawing Sheets

HIGH SPEED SCANNER FOR READING LATENT IMAGES IN STORAGE PHOSPHORS

FIELD OF THE INVENTION

The present invention relates to photography, and more particularly, to a scanner for reading latent images stored in a solid state alternative to photographic film.

BACKGROUND OF THE INVENTION

Conventional photography is based on a photographic film composed of a flexible backing coated with a silver-based light-sensitive emulsion. In this disclosure, such photographic film will be called conventional photographic film. While photography based on conventional photographic film has been highly refined over the years, it has several problems. First, conventional photographic film-based photography is environmentally objectionable. Conventional photographic films involve noxious chemicals such as silver and require the use of chemical developers whose disposal in an environmentally-acceptable manner is becoming increasingly more costly.

Second, conventional photographic film cannot be reused. Most photographers take several pictures for each picture that is actually kept. This leads to many negatives being thrown away. In addition to the cost of the unused negatives, this practice further aggravates the above-mentioned disposal problems.

Third, unexposed conventional photographic film has a finite shelf life. This increases the cost of photography by requiring refrigerated storage and/or the replacement of film that has passed its usable life.

Fourth, the dynamic range of conventional photographic film is less than adequate for many applications. Even black and white film has a gray scale of only 2.5–3 orders of magnitude. Color film is even more limited. In many applications, the range of intensities that must be recorded greatly exceeds this dynamic range. In such situations, at least some portion of the photograph must be over- or under-exposed.

Finally, correction of artifacts in photographs is difficult in conventional film-based systems. Altering the color of limited regions of a negative is all but impossible. Hence, artifacts such as "red eye" in portraits taken with flash cameras must be handled by using special camera arrangements or by touching-up the prints. The latter approach requires talents not normally possessed by the average photographer.

These disadvantages, together with the increased availability of low-cost computing systems, have generated interest in solid state imaging systems such as CCD cameras and the like. Such cameras store their images on computer-readable media such as flash memories or magnetic disks. Since the image is computer-readable, the image may be altered with the aid of software running on a computer, such as a conventional personal computer. Furthermore, these systems are environmentally superior to conventional photographic film-based system in that noxious chemicals are not required to generate and store pictures. Moreover, the storage medium is reusable. Finally, some solid state systems can have significantly more dynamic range than conventional photographic film.

Unfortunately, solid-state cameras having a resolution equivalent to the resolution available with conventional photographic film are far too expensive for use by the average camera user. These cameras are currently sold for about 100 times the cost of an inexpensive camera using conventional photographic film. Lower cost solid-state cameras are available, but these have inferior resolution to conventional film-based cameras. Solid state cameras also suffer from the disadvantage that they cannot take pictures in quick succession because of the processing time required to compress each picture before the next picture can be taken. Moreover, currently-available solid-state cameras cannot be used with lenses designed for existing photographic film-based camera systems. Finally, a user who is not computer literate may have difficulty in having his or her digital images converted to conventional photographic prints.

Accordingly, there has been some interest in developing new image storage media as an alternative to conventional photographic film. An ideal alternative image storage medium would be a film that could be used in a conventional camera instead of conventional photographic film. Storage phosphors have been known for many years. A potentially useful alternative image storage medium may be made by coating a flexible backing with a thin layer of a storage phosphor. The storage phosphor is doped with two impurities, one of which forms electron traps. Light forming an original image on the surface of the storage phosphor elevates electrons in the storage phosphor from the ground state to the conduction band. The electrons elevated into the conduction band by the incident light are trapped in nearby electron traps. The density distribution of the trapped electrons reflects the light intensity distribution of the light forming the original image. In suitable storage phosphors, the trapped electrons remain trapped by the electron traps for several days.

The latent image stored in the storage phosphor is read out by illuminating the storage phosphor with radiation having a longer wavelength than the light forming the original image. For example, infra-red light may be used to read out a latent image formed by visible light. The infra-red light raises the trapped electrons from the electron traps into the conduction band, whence the electrons fall back to their original states, generating visible light. The intensity of the light generated is proportional to the density distribution of the trapped electrons in the storage phosphor, and, therefore, to the light intensity distribution of the original image.

Reading the latent image out from the storage phosphor bleaches, i.e., partially erases, the latent image. The extent of the bleaching depends on the intensity and duration of the infra-red illumination. Because reading a latent image bleaches it, and because an unread latent image will decay over time, a storage phosphor-based photographic film has only a short-term image storage capability. Latent images stored in a storage phosphor must be transferred to another medium for viewing and for long-term storage.

After the latent image stored in the storage phosphor has been transferred to another storage medium for long-term storage, a prolonged exposure to a high intensity of infra-red light will completely erase the latent image. This leaves the storage phosphor ready to record a new latent image when it is exposed again to visible light. Thus, a photographic system based on a film using storage phosphors has the following advantages. It requires no chemical processing after the latent image has been stored. It uses a reusable storage medium. Finally, it uses a storage medium that has a longer shelf life in its unexposed state than that of conventional unexposed photographic film. However, exploiting the advantages offered by a storage phosphor-based photographic film requires a way of transferring the latent image to another medium quickly, simply and at low cost.

U.S. Pat. No. 2,482,813 awarded to Urbach in 1949 describes a system of photography based on storage phosphors. Urbach discloses a method for long-term image storage by transferring the latent image from the storage phosphor to conventional photographic film by contact printing. The storage phosphor is placed in contact with a conventional photographic film and is flooded with infra-red light. The conventional photographic film records an image of the pattern of visible light emitted by the storage phosphor in response to the infra-red illumination. While this technique works, using the storage phosphor as an intermediary provides no advantage, since the original image could as easily be recorded directly on the conventional photographic film. Moreover, Urbach's process still requires the use of conventional photographic film, with its finite shelf life and it need for developing using noxious chemicals.

U.S. Pat. No. 5,065,023 to Lindmayer describes a storage phosphor-based color photography system. To generate the equivalent of color film, the system disclosed by Lindmayer preferably uses three storage phosphors deposited in layers. Each storage phosphor has two dopants, the first of which is different in the three storage phosphors and determines the color sensitivity of the storage phosphor, i.e., the color of light that will lift an electron into the conduction band of the storage phosphor. The second dopant, which is the same for all three storage phosphors, determines the energy level of the electron trap. The second dopant determines the wavelength of the light used to read out the latent image.

When the three storage phosphor layers are illuminated with infra-red light, each storage phosphor emits light of a different color. The intensity of the light emitted by each storage phosphor depends on the light intensity in the original image in the wavelength range to which the storage phosphor is sensitive. This wavelength range is determined by the first dopant. Usually, the emission spectrum of the storage phosphor are shifted towards longer wavelengths compared with the absorption spectrum. However, the resulting color distortion can be corrected using calibration data and a knowledge of the spectral sensitivities of the dopants.

Lindmayer discloses transferring the latent image to a long-term storage medium by flooding the storage phosphor with infra-red light and recording the resulting visible light emitted by the storage phosphor using an image intensifier and CCD camera. The resulting video signal is subject to computer processing, and the resulting image data may be stored in the computer, and displayed on a CRT or printed using a color printer. The image data can also be stored on magnetic or optical discs for long-term storage. The image data can also be selectively modified to correct errors such as "red eye."

However, by using a CCD camera, Lindmayer's system is subject to the most significant constraint of conventional solid-state cameras, namely, the trade off between resolution and cost. Moreover, Lindmayer's system forms an image of the whole area of the storage phosphor on the image intensifier. This requires a large, complex and expensive lens, since the lens must have a large numerical aperture to maximize the intensity of the image of the latent image that it forms on the image intensifier.

None of the known storage phosphor-based photography systems described above offers a way of reading out the latent image stored in the storage phosphor for long-term storage quickly, simply and at low cost.

The inventor devised a reading device based on a flying-spot scanner for use in his initial experiments in reading latent images stored in storage phosphor-based film. In the reading device, the storage phosphor in which a latent image was stored was mounted on a mechanical x-y stage and an infra-red laser beam was focused on the surface of the latent image to form an illumination spot about 10 μm in diameter. The latent image stored in the storage phosphor was read out one fixel at a time by operating the mechanical x-y stage in steps equal to the size of one fixel to change the position of the illumination spot in the latent image. As will be discussed in greater detail below, a fixel is one picture element of the latent image. The process was repeated until the entire area of the latent image had been scanned in a raster pattern. The visible light emitted by the latent image in response to the infra-red light was collected by a lens and focused on a high-gain photo-multiplier. The picture signal generated by the photo-multiplier for each fixel of the latent image was stored in a computer. The computer was also programmed to apply color correction to the picture signals. The picture signals could then be displayed using the computer's color monitor, and/or printed using a suitable high-resolution color printer. The picture signals could also be stored on the computer's hard disc, or transferred to a storage medium such as a floppy disc, CD-ROM, or flash memory card for long-term storage external to the computer.

The intensity of the visible light emitted by the latent image in response to the infra-red light was so low that the photomultiplier required an integration time of about 200 ms for an adequate signal-to-noise ratio. This reduced the scan rate to about five fixels/s. Since more than six million pixels must be read to provide a spatial resolution comparable with 35 mm photographic film, recording each latent image took about 70 hours. This was far too slow for a commercial product. Moreover, the spatial resolution of this arrangement was less than predicted because the area of the latent image that emitted visible light in response to the illumination spot was greater than the area of the illumination spot itself. The area of visible light emission was greater than the area of the illumination spot due to the particles of the storage phosphor scattering of the infra-red light beam.

Accordingly, an improved apparatus for reading the latent image stored in a storage phosphor is required. The apparatus should scan the latent image in less than two minutes with a spatial resolution comparable with that of conventional photographic film, and should not require the use of a large-diameter, fast lens.

SUMMARY OF THE INVENTION

The invention provides a method of generating picture signals representing a stored image stored in an image storage medium. In the method, a sensor array and a stimulation beam are provided. The sensor array includes a rectangular array of pixels. Each pixel generates an image signal in response to light. The stimulation beam has a monotonic non-uniform intensity distribution. An image of an object area of the stored image is formed on the sensor array to define in the object area a fixel corresponding to each pixel of the sensor array. The object area is a small fraction of the area of the stored image and has a position relative to the stored image. The stored image is stimulated by forming a stimulation spot on the stored image using the stimulation beam. The stimulation spot is substantially centered in the object area. The stored image is scanned with the object area and the stimulation spot. This defines fixels in the stored image and generates a picture signal for each fixel. The picture signal for each fixel represents the accumulation of light emitted by the fixel in response to the stimulation spot. In scanning the stored image, the position of the object area and stimulation spot is successively changed relative to the stored image along a first axis to scan a slice of the stored image.

Successive slices of the stored image are scanned along a second axis, substantially orthogonal to the first axis. At each position of the object area in the stored image, the sensor array is controlled to generate an image signal in response to the light emitted by each fixel in the object area. Finally, for each fixel in the stored image, all the image signals generated by the sensor array are accumulated to generate the picture signal for the fixel. The image signals are generated by the sensor array in response to the light emitted by the fixel at each position of the object area in the stored image in which the fixel is inside the object area.

The stimulation spot has an intensity, a peak intensity and a radius of $w_0$ at which the intensity is $e^{-2}$ of the peak intensity. The radius $w_0$ may be about one third of the width of the object area.

When the position of the object area and the stimulation spot are changed to scan a slice of the stored image, the slice has a width equal to the width of the object area. When successive slices of the stored image are scanned, the slices may be overlapped by a slice overlap amount of at least one half the width of the slices. Preferably, the slice overlap amount is three-fourths of the width of the slices.

The stimulation beam may have a single Gaussian intensity distribution, and the stimulation spot preferably has an intensity of substantially zero outside the object area.

The sensor array preferably operates in a time delay and integration (TDI) mode. In this case, the pixels of the sensor array are arranged in a two-dimensional array of rows and columns with the columns are parallel to the first axis. When all the image signals are accumulated to generate the picture signal for the fixel, when each slice of the stored image in which the fixel lies inside the object area is scanned, all the image signals generated by the pixels in one column of the sensor array are accumulated to generate an accumulated image signal for the fixel. The image signals accumulated are only those generated in response to the light emitted by the fixel in successive positions of the object area in which the fixel is inside the object area. In addition, the accumulated image signals generated for the fixel are further accumulated to generate the picture signal for the fixel.

As an alternative, when all the image signals are accumulated to generate the picture signal for the fixel, when slices of the stored image in which the fixel is inside the object area are scanned, all the image signals generated by the sensor array are accumulated to generate the picture signal for the fixel. The image signals accumulated are only those generated in response to the light emitted by the fixel in successive positions of the object area and the stimulation spot in which the fixel is inside the object area.

The method may generate picture signals representing a latent image stored in a storage phosphor, in which case, the stimulation beam may be a beam of infra-red light.

The method also provides an apparatus for generating picture signals representing a stored image stored in an image storage medium. The apparatus comprises a sensor array, an image forming element, a stimulator, and a picture signal generator. The sensor array includes a rectangular array of pixels that generate an image signal in response to light. The image forming element forms an image of an object area of the stored image on the sensor array and defines in the object area a fixel corresponding to each pixel in the sensor array. The object area is a small fraction of the area of the stored image and has a position relative to the stored image. The stimulator stimulates the stored image with a stimulation beam having a monotonic non-uniform intensity distribution to form a stimulation spot substantially centered in the object area. The picture signal generator scans the stored image to define fixels in the stored image and to generate a picture signal for each fixel. The picture signal represents the intensity of light emitted by the fixel in response to the stimulation beam.

The picture signal generator includes a position changer, a controller, and an image signal accumulator. The position changer successively changes the position of the object area and stimulation spot relative to the stored image along a first axis to scan a slice of the stored image, and for scans successive slices of the stored image along a second axis, substantially orthogonal to the first axis. The controller operates at each position of the object area in the stored image, and controls the sensor array to generate an image signal in response to the light emitted by each fixel in the object area. The image signal accumulator operates for each fixel in the stored image, and accumulates all the image signals generated by the sensor array in response to the light emitted by the fixel to generate the picture signal for the fixel. The image signals accumulated for the fixel are those generated by the sensor array for the fixel at each position of the object area in the stored image in which the fixel is inside the object area.

The stimulating beam has an intensity, a peak intensity, and a radius of $w_0$ at which the intensity is $e^{-2}$ of the peak intensity. The radius $w_0$ may be about one third the width of the object area.

The slices each have a width equal to the width of the object area, and the position changer may scan the stored image in slices that overlap by a slice overlap amount of at least one half the width of the slices. As described above, the preferred slice overlap amount is three-fourths of the width of the slices.

The stimulation beam may have a single Gaussian intensity distribution. The stimulation spot preferably has an intensity of substantially zero outside the object area.

The sensor array may include a time delay and integration (TDI) sensor array, in which case, the pixels of the sensor array are arranged in a two-dimensional array of rows and columns, with the columns parallel to the first axis, and the accumulator includes a columnar accumulator and a slice-wise accumulator. The columnar accumulator operates when the position changer scans each slice of the stored image in which the fixel is inside the object area and accumulates all the image signals generated by the pixels in one column of the sensor array to generate an accumulated image signal for the fixel. The columnar accumulator only accumulates those image signals generated in response to the light emitted by the fixel in successive positions of the object area and stimulation spot in which the fixel is inside the object area. The slice-wise accumulator accumulates the accumulated image signals generated for the fixel by the columnar accumulator to generate the picture signal for the fixel.

The image processor may include an accumulation element that operates when the position changer scans the slices of the stored image in which the fixel is inside the object area and accumulates all the image signals generated by the sensor array in response to the light emitted by the fixel to generate the picture signal for the fixel. The accumulation element only accumulates those image signals generated by the sensor array in successive positions of the object area and the stimulation spot in which the fixel is inside the object area.

The apparatus may generate picture signals representing a latent image stored in a storage phosphor, in which case, the stimulation element may include a source of infra-red light.

DETAILED DESCRIPTION OF THE INVENTION

The scanner according to the invention uses a low-cost, small-diameter lens and a CCD element with relatively few pixels to read a latent image stored in a storage phosphor. The scanner reads the latent image in about 90 seconds with a spatial resolution comparable to that of conventional photographic film.

Figure 1:
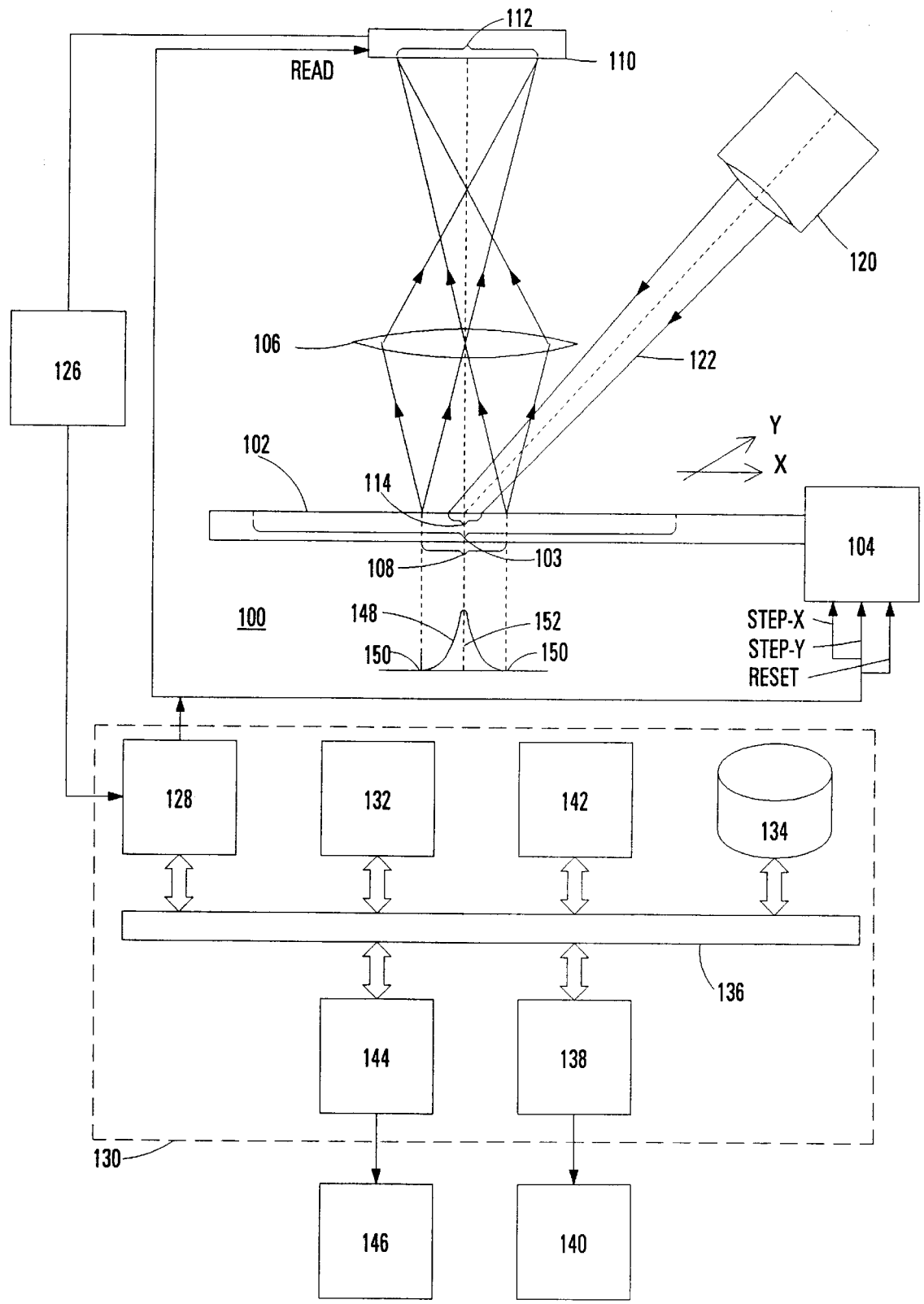
FIG. 1 is a block diagram of the scanner according to the invention.

A block diagram of the scanner 100 according to the invention is shown in FIG. 1. In the scanner 100, the storage phosphor 102 in which the latent image 103 is stored is mounted in the mechanical x-y stage 104. The lens 106 forms a magnified image 112 of a small, two-dimensional part of the latent image on the sensor array 110. The small, two dimensional part of the latent image whose image 112 covers the sensor array will be called the object area 108. The infra-red source 120 illuminates the storage phosphor with the beam 122 of infra-red light, which forms the illumination spot 114 in the center of the object area. Operation of the mechanical x-y stage to move the latent image changes the location of the object area and the illumination spot in the latent image.

The sensor array 110 is a two-dimensional array of light-sensitive elements (not shown). Each light-sensitive element generates an electrical image signal representing the integral of the light flux falling on it in the time between consecutive edges of a READ command signal. The size of the light-sensitive elements determines the spatial resolution of the sensor array because each light-sensitive element is unable to distinguish spatial variations in the intensity of the light falling on it. The sensor array can therefore be said to be composed of a two-dimensional array of picture elements, each of which corresponds to one light-sensitive element. The picture elements of the sensor array will be called pixels.

In contrast, at a spatial resolution corresponding to that of conventional photographic film, the storage phosphor 102, and, therefore, the latent image 103, may be regarded as lacking picture elements that are unable to distinguish spatial variations of light intensity. However, forming the magnified image 112 of the object area 108 on the sensor array 110 effectively defines picture elements in the object area. Spatial variations of the light intensity in the picture elements of the object area cannot be distinguished because the light emitted by each picture element of the object area falls on one pixel of the sensor array, and the pixel is unable to distinguish spatial variations in the intensity of this light. To distinguish the picture elements defined in the latent image from the picture elements of the sensor array, the picture elements in the object area will be called fixels.

Also, since the x-y stage 104 moves the storage phosphor 102 relative to the object area 108 and the illumination spot 114 to scan the entire area of the latent image 103 in the y-direction in steps equal to the height of one fixel, and in the x-direction in steps equal to a multiple of the width of one fixel, scanning the latent image defines fixels in the entire area of the latent image. The width and height of the fixel are the dimensions of the fixel in the x-direction and the y-direction, respectively. The way in which the latent image is scanned in a series of overlapping slices, each of which has a width equal to the width of the object area, will be described in greater detail below with reference to FIGS. 2A–2F.

A stripe-type color filter (not shown), similar to that used in conventional consumer video cameras, may be located in front of the sensor array 110 to enable the image signals generated by the sensor array to represent chrominance information in addition to luminance information. With a stripe-type color filter, the spatial resolution of the chrominance information is less than that of the luminance information. Chrominance information may be generated with the same spatial resolution as the luminance information by dividing the light emitted by the latent image 103 into three optical paths to form the image 112 on three identical sensor arrays, each preceded by a different color filter. Alternatively, beam-splitting color filters may be used to divide the light emitted by the latent image into the three optical paths.

The sensor array 110 generates a frame of N image signals in response to a READ command signal generated after each time the x-y stage 104 has moved the storage phosphor relative to the object area 108 and the stimulation spot 114, where N is the number of pixels in the sensor array. Each image signal in the frame of image signals is generated by one pixel of the sensor array and represents the integrated intensity of the light falling on the pixel from one fixel in the object area 108 of the latent image 103 during a predetermined integration time. The integration time may be defined by the time between active READ command signal edges. The frames of image signals are fed to the analog-to-digital converter (ADC) 126, which converts them into digital form to enable them to be processed by the image processor 130. Alternatively, the sensor array may generate the frames of image signals in digital form, in which case, the analog-to-digital converter is not required. The frames of image signals are fed to the input/output (I/O) port 128 of the image processor 130. To simplify the following description, the sensor array will be said to feed image signals to the image processor irrespective of whether the image signals originate in digital form in the sensor array itself or are analog signals digitized by the ADC.

The image processor 130 includes the microprocessor 132, the memory 142 and the mass-storage device 134 interconnected by the bus 136. The image processor processes the frames of image signals to generate picture signals representing the latent image 103 stored in the storage phosphor 102. The picture signals are initially at least partially stored in the memory 142. The image processor may transfer the picture signals representing the latent image to the mass-storage device 134 for longer-term storage. The mass-storage device may store the picture signals on a storage medium (not shown) such as a hard disk, a floppy disk, a recordable CD-ROM, a flash memory card, or another medium capable of storing a large number of digital data. The storage medium may be removable from the image processor to enable the latent image represented by the picture signals stored in the storage medium to be stored, copied and/or displayed elsewhere.

The image processor 130 may optionally include the graphics adaptor 138 connected to the bus 136. The video monitor 140 may optionally be connected to the graphics adaptor to display the latent image in response to signals that the graphics adaptor generates from the picture signals. The image processor may also optionally include the printer port 144 connected to the bus. The printer 146 may optionally be connected to the printer port to print hard copies of the latent image in response to the picture signals supplied via the printer port.

The image processor 130 may include hardware (not shown) connected to the bus 136 to correct the chrominance information represented by the picture signals for differences between the spectral sensitivity of the storage phosphor 102 and the spectral sensitivity of the human eye. Alternatively, the microprocessor 132 may be programmed to perform color correction if such correction is required.

The image processor 130 may include hardware (not shown) connected to the bus 136 to compress the picture signals representing the latent image to generate compressed picture signals for storage by the mass-storage device 134. Fewer bytes of the mass-storage device are required to store the compressed picture signals representing the latent image than to store the picture signals themselves. Alternatively, the microprocessor 132 may be programmed to perform compression of the picture signals to generate the compressed picture signals. However, compression using the microprocessor normally takes more time than using additional compression hardware.

Finally, the image processor 130 may include hardware (not shown) connected to the bus 136 to enable the picture signals representing the latent image to be transmitted to a remote location for storage, copying, and/or display.

The scanner 100 will now be described in greater detail. The sensor array 110 has far fewer pixels than the number of fixels in the latent image 103. For example, approximately 6.3 million (3072×2048) fixels are required to give a spatial resolution comparable with that of conventional 35 mm photographic film having picture area dimensions of 36 mm×24 mm. In contrast, in a practical embodiment of the scanner 100, the sensor array 110 had 65,336 (256×256) pixels. The sensor array can have far fewer pixels than the number of fixels in the latent image because the latent image is scanned by the stimulation spot 114 and the object area 108, the image of which is formed on the sensor array 110. The sensor array 110 with about 65,000 pixels is far less expensive than the sensor array with about 6.3 million pixels that would be required to provide the same spatial resolution if an image of the whole area of the latent image were formed simultaneously on the sensor array.

The lens 106 forms the magnified image 112 of the object area 108 on the sensor array 110. The magnification given by the lens is determined by the ratio of the dimensions of the pixels of the sensor array to the desired spatial resolution. For example, in a storage phosphor storing the latent image 103 with dimensions equal to those of the picture area of a conventional 35 mm photographic film, fixels smaller than about 11.7×11.7 $\mu$m (36,000/3072) are required to provide a spatial resolution comparable to that of the conventional photographic film. In a practical embodiment of the scanner 100, the dimensions of the pixels of the 256×256 pixel sensor array 110 were about 54×54 $\mu$m. To provide the required spatial resolution, a fixel size of 10×10 $\mu$m was chosen, and the storage phosphor 102, the lens 106, and the sensor array 110 were arranged so that the linear dimensions of the object area were magnified about 5.4 times in the image 112 formed on the sensor array.

Because a latent image 103 stored in the storage phosphor 102 is at least partially erased by scanning it, scanning a latent image is different from scanning a permanent image, such as a conventional photographic image. The signal-to-noise ratio of image signals generated by a sensor array in response to a conventional photographic image can be increased (at the expense of a longer scanning time) simply by increasing the integration time of the sensor array. However, since a latent image will emit only a finite amount of light before it is fully erased, increasing the integration time when scanning a latent image does not necessarily increase the signal-to-noise ratio of the image signals.

To maximize the signal-to-noise ratio of the image signals generated in response to the object area 108 of the latent image 103, as much as possible of the light emitted by the object area must be transferred to the sensor array 110. The fraction of the light emitted by the object area transferred to the sensor array depends on the numerical aperture of the lens 106. The size, number of elements and cost of the lens 106 for a given numerical aperture depends in turn on the size of the object area. With the above-mentioned 256×256 pixel sensor array 110 and a magnification of about 5.4 times, the object area of the latent image is about 2.6 mm square. The small size of the object area, and the smaller number of resolvable elements in the object area compared with the size of and the number of resolvable elements in the whole latent image enables the lens 106 to have a wide aperture even when an inexpensive, small-diameter lens is used. For example, in the practical embodiment just referred to, a good signal-to-noise ratio was obtained using a lens with a focal length of 50 mm and a numerical aperture of about 0.38.

The light emitted by each fixel of the object area 108 of the latent image 103 in response to the infra-red beam 122 is proportional, in part, to the integrated intensity of the infra-red stimulation to which the fixel is subject. The integrated intensity of the infra-red stimulation to which each fixel is subject will be called the "stimulation dose." Thus, to obtain an accurate readout of the latent image, the infra-red beam must stimulate the entire object area with a stimulation dose that has a uniformity of better than about 1%. Providing this order of stimulation dose uniformity over the entire object area is especially difficult because the object area is typically square or rectangular. Stimulation dose variations greater than about 1% can manifest themselves as luminance errors in the picture signals, and luminance banding in the reproduced latent image.

To prevent luminance errors in the picture signals, the infra-red beam 122 should not only stimulate the entire object area uniformly, but also the intensity of the infra-red beam should drop to zero at the edges of the object area in a distance equivalent to the dimensions of one fixel. The intensity of the infra-red beam must drop to zero outside the object area 108 because any stimulation of the latent image in a leakage area outside the object area will cause the leakage area to emit light that will not be captured by the sensor array 110. Moreover, stimulating the leakage area bleaches, i.e., partially erases, the latent image in the leakage area, so that the latent image in the leakage area will emit less light when the next slice is scanned and the leakage area lies inside the object area.

If the infra-red beam 122 stimulates the entire object area 108 uniformly with no stimulation outside the object area, the latent image 103 can be scanned by operating the x-y stage 104 to scan the latent image in a series of abutting slices, each equal in width to the width of the object area. The width of the object area is the dimension of the object area in the x-direction. At the end of scanning each slice in the y-direction, the x-y stage 104 would move the storage phosphor 102 in the x-direction by a distance equal to the entire width of the slice, and would then scan the next slice.

Since generating the infra red beam 122 so that it stimulates the entire object area 108 with the required stimulation dose uniformity and provides no stimulation outside the object area is very difficult, the scanner 100 according to the invention uses an infra-red beam that gives the stimulation spot 114 a distinctly non-uniform intensity profile. To obtain the effect of the entire object area being subject to a stimulation dose of the required uniformity, the latent image 103 is scanned in the x-direction in slices that overlap by an overlap amount of at least one half the width of the slices. Scanning the latent image in such overlapping slices reads each fixel in the latent image at least twice. Each fixel is read once when each of at least two consecutive slices is scanned.

The scanning process just described generates multiple image signals for each fixel of the latent image. When each slice is scanned, the sensor array 110 generates one image signal in every step of scanning the latent image in the y-direction while the fixel is in the object area. Moreover, the fixel is read each time at least two consecutive slices is scanned. The image processor 130 then generates a picture signal for each fixel in the latent image by accumulating all the image signals generated for the fixel when the latent image is scanned. The picture signal represents the total amount of light emitted by the fixel in response to the stimulation dose provided by the stimulation spot 114.

In a practical embodiment of the scanner 100, the sensor array 110 was a two-dimensional array of 256×256 pixels, and the shift in the x-direction between consecutive slices was one-fourth of the width of the slice. Since consecutive slices overlapped by an overlap amount of three-fourths of the width of a slice, each fixel was scanned four times, and 1024 (256×4) image signals were accumulated to generate the picture signal for each fixel in the latent image.

Scanning the latent image 103 in consecutive overlapping slices and accumulating all the image signals generated by the sensor array 110 for each fixel enables the stimulation spot 114 both to have a non-uniform intensity distribution and enables the high-intensity part of the stimulation spot to be made substantially smaller than the object area 108. Making the high-intensity part of the stimulation spot substantially smaller than the object area makes it easier to reduce the intensity of the stimulation spot outside the object area to a level at which an insignificant amount of bleaching occurs. This ensures that accumulating the image signals generated by the sensor array 110 results in a picture signal that represents all the light emitted by the latent image 103 in response to the stimulation spot.

In a practical embodiment of the scanner 100, the stimulation spot 114 had the single-Gaussian intensity profile illustrated by the curve 148 in FIG. 1. In this intensity profile, the $3w_0$-diameter intensity contour of the stimulation spot just fits inside the object area 108, where $w_0$ is the radius of the intensity contour where the intensity of the stimulation spot is $e^{-2}$ (roughly ⅐th) of the peak intensity at the center of the stimulation spot. This intensity profile gives a substantially zero intensity at the edges 150 of the object area located at ±128 fixels from the center of the object area.

A stimulation spot 114 with the intensity profile just described can easily be provided by including in the infra-red source 120 an infra-red LED or an infra-red filtered quartz-halogen lamp to generate the infra-red light, and a converging lens to collimate the infra-red light to form the stimulation spot. To achieve the required stimulation dose uniformity with the above-described stimulation intensity profile, consecutive slices are shifted in the x-direction by a shift amount equal to one-fourth of the width of the slice, i.e., by one-fourth of the width of the object area, as noted above.

The processing used to integrate the widely-varying intensities of infra-red light stimulating the fixels located in different positions in the shift region between consecutive scans while scanning four consecutive slices, will be described below with reference to FIG. 4. This processing results in a stimulation dose uniformity of better than about 0.5%.

A more sophisticated optical arrangement may be used in the infra-red source 120 to provide the stimulation spot 114 with a more uniform intensity over a wider area near the center 152 of the stimulation spot, and an illumination intensity approaching zero at the edges 150 of the object area. With such a stimulation spot, the required stimulation dose uniformity may be obtained with consecutive slices shifted in the x-direction by a shift amount greater than one-fourth of the width of the slice. For example, consecutive slices may be shifted in the x-direction by a shift amount equal to one-half of the width of the slice. Increasing the shift between consecutive slices decreases the time required to read the latent image stored in the storage phosphor. Alternatively, the shift amount between consecutive slices may be decreased if better stimulation dose uniformity is required, but this increases the time required to read the latent image.

The stimulation spot 114 need not have a Gaussian intensity profile. Any monotonic intensity profile that falls to near zero intensity at the edges of the object area 108 and that is broader than the shift amount between consecutive slices can be used.

Operation of the x-y stage to scan the latent image with the object area and the stimulation spot will now be described with reference to FIGS. 1 and 2A–2F. The image processor 130 controls the operation of the x-y stage 104 and the timing relationship between the operation of the x-y stage and the feeding of the image signals from the sensor array 110 to the image processor in addition to processing the image signals received from the sensor array 110. The image processor generates the READ command signal, which it feeds via the I/O port 128 to the sensor array 110, and generates the STEP-Y, STEP-X, and RESET command signals, which it feeds to the x-y stage 104, also via the I/O port 128. The image processor also keeps a register in the memory 142 where it stores object area position data indicating the location of the object area in the latent image.

FIGS. 2A–2F show the storage phosphor 102 mounted on the x-y stage 104 while scanning the latent image 103 stored in the storage phosphor. The position of the object area 108 and the stimulation spot 114 in the latent image are also shown in each of these figures. The stimulation spot is centered in the object area. The figures all show the $w_0$ intensity contour (solid line) and the $3w_0$-diameter intensity contour (broken line) that just fits inside the object area. To simplify the drawings, the $w_0$ intensity contour and the $3w_0$-diameter intensity contour are respectively indicated by the reference numerals 238 and 240 in FIG. 2A only.

After a storage phosphor 102 with an unread latent image 103 is loaded into the x-y stage 104, the image processor 130 feeds the RESET command signal to the x-y stage to reset the x-y stage to its starting position. The starting position locates the latent image so that the object area 108 is positioned at the bottom left-hand corner of the latent image, and overlaps the latent image by the height of one fixel in the y-direction, and by the shift amount between consecutive slices, e.g., 64 fixels, in the x-direction. The shift region resulting from the shift amount is indicated by the reference numeral 235 in FIG. 2A.

After the x-y stage 104 is settled in its starting position, the infra-red source 120 is switched on to stimulate the object area 108, and the image processor 130 feeds the READ command signal to the sensor array 110. The READ command signal remains in its READ state for the integration time of the sensor array, and each pixel of the sensor array generates an image signal in response to the light the pixel receives from the latent image. At the end of the integration time, the state of the READ command signal changes. This causes the sensor array to feed one frame of image signals to the ADC 126. The ADC feeds a corresponding frame of image signals in digital form for processing by the image processor 130.

The image processor 130 next feeds the STEP-Y command signal to the x-y stage 104. The STEP-Y command signal causes the x-y stage to move the latent image 103 in the −y-direction, as indicated by the arrow 227 in FIG. 2A. The x-y stage moves the latent image by a distance equal to the height of one fixel, which is the dimension of the fixel in the y-direction. This changes the position of the object area 108 and the stimulation spot 114 in the latent image by the same distance in the +y direction, as indicated by the arrow 229. After the x-y stage settles in its new position, the image processor again feeds the READ command signal to the sensor array 110, which causes the sensor array to generate another frame of the image signals and feed it to the image processor 130.

The image processor 130 generates successive STEP-Y and READ command signals. In response to these command signals, the x-y stage 104 and the sensor array 110 respectively perform stepping and image signal generating to read the part of the latent image indicated by the shaded area 205 in FIG. 2A. This continues until the x-y stage has moved the latent image 103 to cause the object area 108 and the stimulation spot 114 to scan a first slice 207 extending across the latent image in the y-direction.

As noted above, the width of the first slice 207, and of subsequent slices, is equal to the width of the object area 108. The first slice partially overlaps the latent image 103 in the x-direction by a fraction (1/n) of the width of the slice. The maximum value of the fraction is one half, so that each fixel in the latent image is read in the course of scanning at least two consecutive slices. Thus, in the fraction 1/n, n≧2, and n is normally an integer. In the example shown in FIGS. 2A–2F, the value of n is four, and the fraction of the width of the slice is one-fourth of the width of the slice, corresponding to 64 fixels of the latent image. Also, as noted above, the value of n may be different from four; for example, n may be 2, 3, 5, 8, or another suitable value.

At the end of the first slice 207, the image processor 130 generates a STEP-X command signal. The STEP-X command signal causes the x-y stage 104 to shift the storage phosphor 102 in the -x-direction by a shift amount equal to 1/n of the width of the object area 108. This movement of the storage phosphor, indicated by the arrow 209 in FIG. 2B, changes the position of the object area and the stimulation spot 114 in the latent image 103 by the same shift amount in the +x-direction, as indicated by the arrow 213.

Successive STEP-X command signals additionally toggle the direction in which the x-y stage 104 steps in response to the STEP-Y command signal from the −y-direction to the +y-direction and vice versa. Thus, the first STEP-X command signal after the RESET command signal changes the stepping direction from the −y-direction to the +y-direction, as indicated by the arrow 231. Alternatively, each STEP-X command signal may additionally cause the x-y stage to retrace rapidly in the +y-direction to the beginning of the slice. In this case, the x-y stage always steps in the −y-direction in response to the STEP-Y command signal.

Figure 2A:
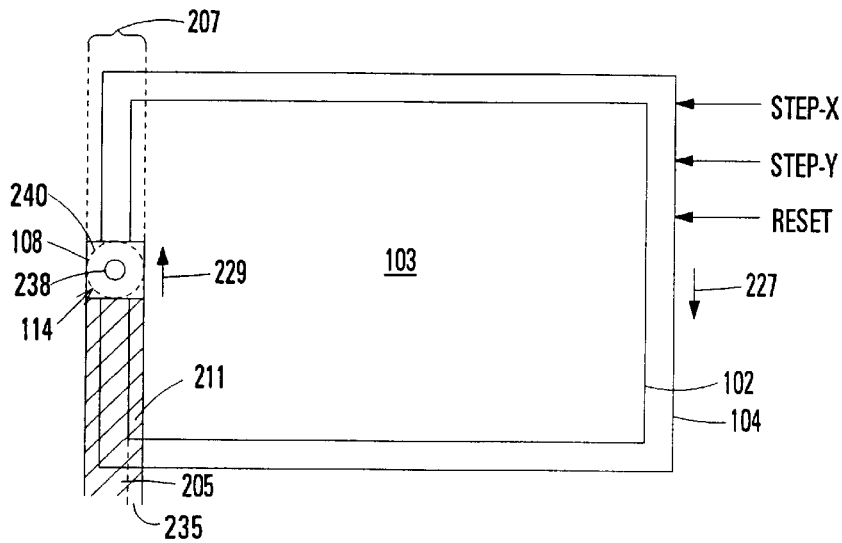
FIGS. 2A through 2F illustrate the sequence of scanning six overlapping slices of the latent image with the object area and the stimulation spot.
Figure 2B:
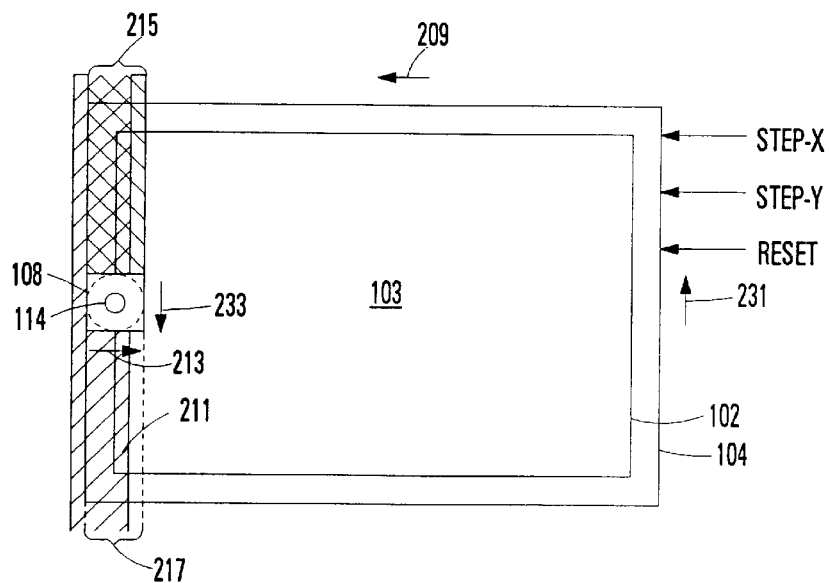
Figure 2C:
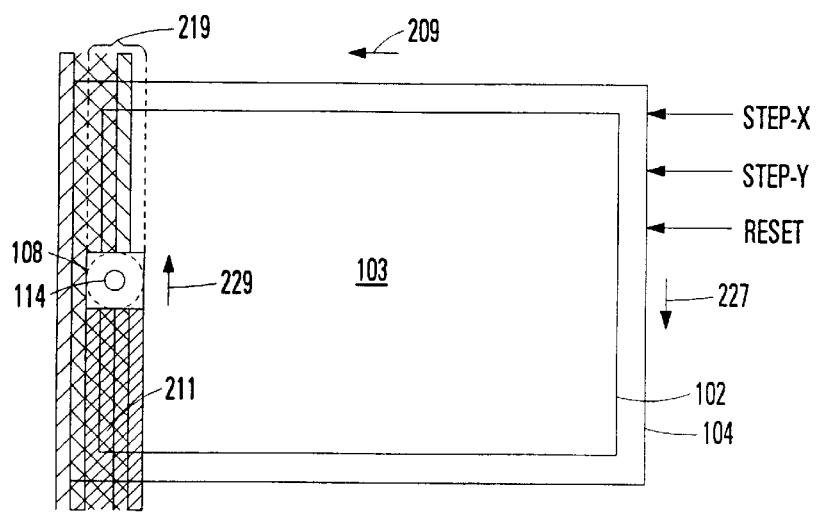
Figure 2D:
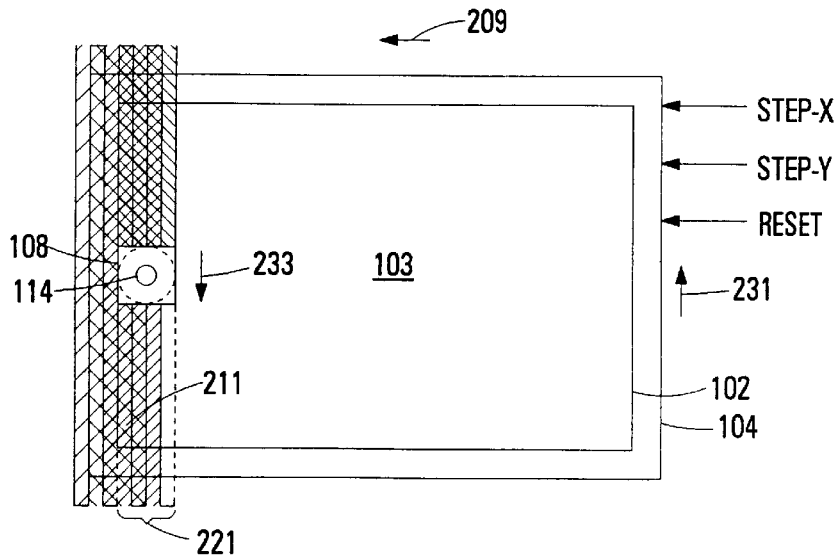
Figure 2E:
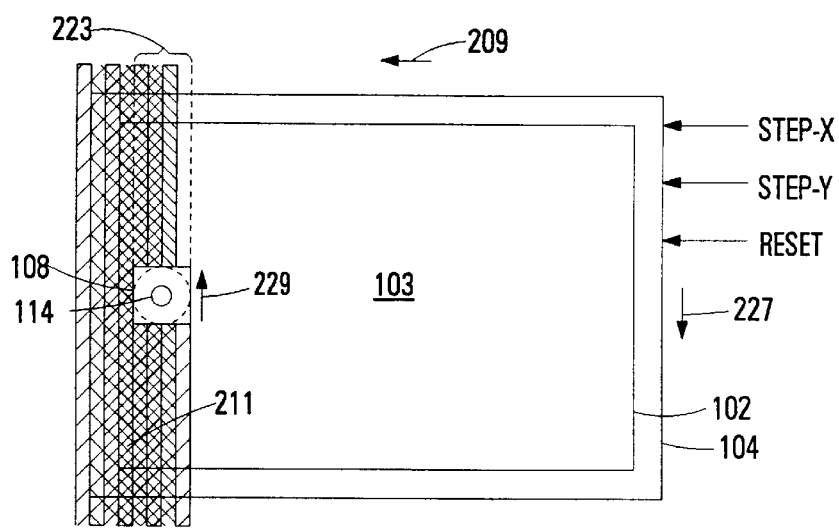
Figure 2F:
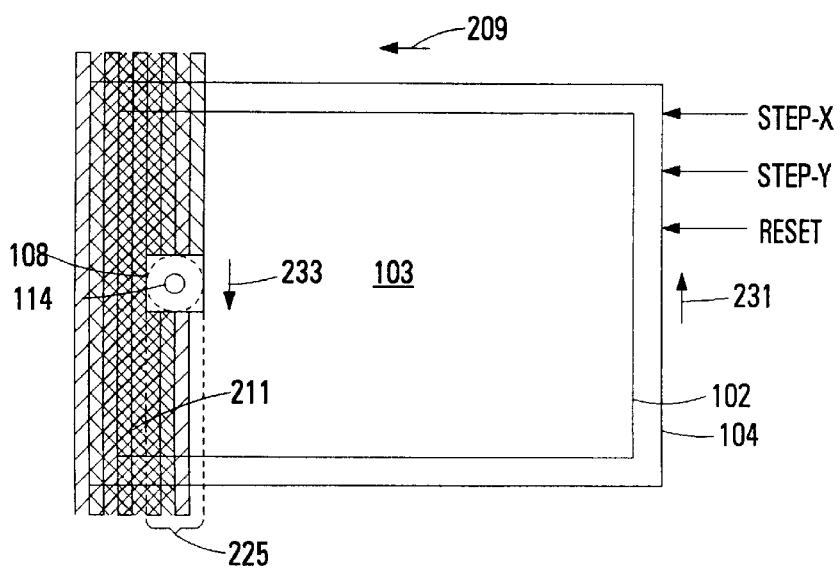

The image processor 130 then generates successive READ and STEP-Y command signals to cause the object area 108 and the stimulation spot 114 to read the part of the latent image 103 indicated by the shaded area 215 shown in FIG. 2B. This process continues until the object area and the stimulation spot have scanned the second slice 217 extending across the latent image in the y-direction. The second slice partially overlaps the first slice by the overlap amount of (1-1/n) of the width of the slices. In the example shown in the figures, the second slice partially overlaps the first slice by an overlap amount equal to ¾ of the width of the slice. The second slice also partially overlaps the latent image by (1-2/n) of the width of the slices.

Further STEP-X command signals from the image processor 130 each cause the x-y stage 104 to shift by the shift amount in the −x-direction. After each STEP-X command signal, repetitive READ and STEP-Y command signals cause the x-y stage to step in the −y-direction or the +y-direction in steps equal to the height of one fixel. The direction of the steps depends on whether an even number or an odd number of STEP-X command signals have been received. The STEP-X command signals, each followed by repetitive READ and STEP-Y command signals, cause the x-y stage to shift and to step until the entire latent image has been scanned with partially-overlapping slices scanned in the y-direction and extending across the latent image in the x-direction. At the end of every step, the sensor array 110 feeds a frame of image signals to the image processor.

A third slice 219, a fourth slice 221, a fifth slice 223 and a sixth slice 225 of the latent image 103 are shown in FIGS. 2C, 2D, 2E and 2F, respectively. The directions of motion of the x-y stage in response to the STEP-X and STEP-Y command signals are respectively indicated in the figures by the arrow 209, and by the arrows 227 and 231. Successive slices partially overlap one another by (1- 1/n) of the width of the slices. The third slice 219 partially overlaps the latent image by (1-3/n) of the width of the slices. The fourth slice 221 and subsequent slices fully overlap the latent image.

In the example shown in FIGS. 2A–2F, it can be seen that, because successive slices partially overlap one another by an overlap amount equal to ¾ of the width of the slice, each fixel of the latent image 103 is scanned four times, once in each of four successive slices. For example, the fixel 211 is read when the first, second, third, and fourth slices are scanned, but is not read when the fifth and sixth slices are scanned.

Figure 4:
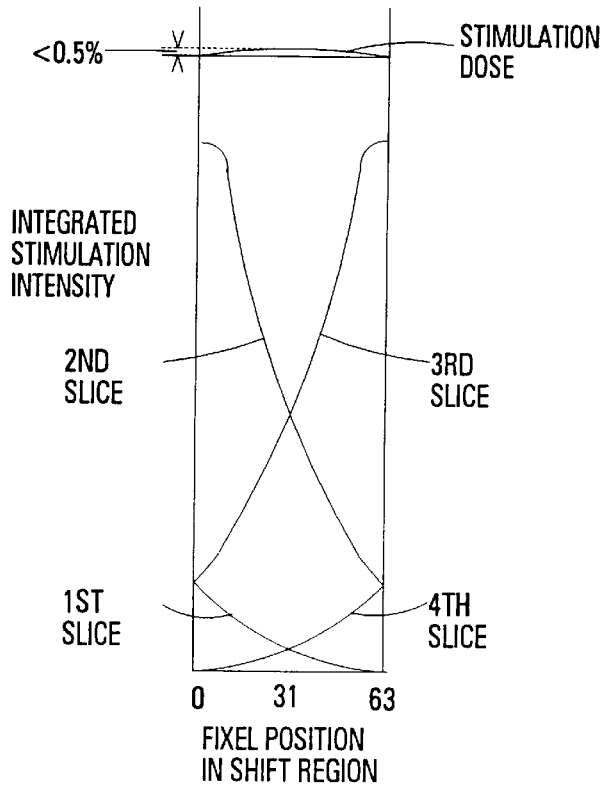
FIG. 4 is a graph showing how the integrated intensity of the part of the stimulation spot stimulating the 64 fixels disposed across the shift region between consecutive slices varies with the position of the fixel in the shift region when four slices of the latent image are scanned.

FIG. 4 shows how the integrated intensity of the part of the stimulation spot 114 stimulating the 64 fixels disposed across the shift region 235 between consecutive slices varies with the position of the fixel in the shift region when the first four slices 207, 217, 219, and 221 of the latent image 103 are scanned. In the example shown, the x-y stage 104 shifts the latent image 103 in the −x-direction, as indicated by the arrow 209 shown in FIGS. 2A–2D. As the x-y stage 104 steps the latent image 103 in the y-direction, causing the object area 108 and the stimulation spot 114 to step past each fixel, the fixel is subject to stimulation intensity that starts at about zero when the fixel enters the object area 108. The stimulation intensity increases progressively to a maximum, and then decreases progressively back to zero as the fixel leaves the object area. The stimulation intensity curves shown in FIG. 4 are the result of integrating the stimulation intensity to which each fixel is subject in each of the 256 steps that the fixel remains inside the object area. The integrated intensity stimulating each fixel in the shift region differs, depending on the position of the fixel in the x-direction in the shift region and on the slice being scanned, as shown in FIG. 4.

The fixels 0–63 in the shift region 235 are inside the object area 108 for the first time when the first slice 207 is scanned. When the first slice is scanned, the fixels 0–63 are stimulated by the right-hand edge portion of the stimulation spot 114, and the integrated stimulation intensity is greatest for the fixel 0 at the left-hand edge of the shift region, and progressively decreases to approximately zero at the fixel 63 at the right-hand edge of the shift region.

The fixels 0–63 in the shift region 235 are inside the object area 108 for a second time when the second slice 217 is scanned. When the second slice 217 is scanned, the fixels are stimulated by the right-hand center portion of the stimulation spot 114. The integrated stimulation intensities of the fixels 0–63 are greater than when the first slice 207 was scanned. The integrated stimulation intensity is greatest for pixel 0 at the left-hand edge of the shift region, and progressively decreases to a minimum at fixel 63. The integrated stimulation intensity of the fixel 63 when the second slice is scanned is about the same as that of the fixel 0 when the first slice 207 was scanned.

The fixels 0–63 in the shift region 235 are inside the object area 108 for a third time when the third slice 219 is scanned. When the third slice is scanned, the fixels are stimulated by the left-hand center portion of the stimulation spot. The integrated stimulation intensities of the fixels are about the same as when the second slice 217 was scanned, but the integrated stimulation intensity is greatest for the fixel 63, and progressively decreases to a minimum at the fixel 0. Thus, the fixels 32–63 at the right-hand side of the shift region, which had lower integrated stimulation intensities than the fixels 0–31 at the left-hand side of the shift region when the second slice was scanned, have higher integrated stimulation intensities than the fixels 0–31 when the third slice is scanned.

The fixels 0–63 in the shift region 235 are inside the object area 108 for a fourth and last time when the fourth slice 221 is scanned. When the fourth slice is scanned, the fixels are stimulated by the left-hand edge portion of the stimulation spot 114. The integrated stimulation intensities of the fixels are about the same as when the first slice 207 was scanned, but the integrated stimulation intensity is greatest for the fixel 63, and progressively decreases to a minimum at the fixel 0. Thus, similar to when the third slice was scanned, the fixels 32–63 at the right-hand side of the shift region, which had lower integrated stimulation inten-sities than the fixels 0–31 at the left-hand side of the shift region when the first slice was scanned, have higher integrated stimulation intensities than the fixels 0–31 when the fourth slice is scanned.

Also shown in FIG. 4 is the variation of the stimulation dose across the width of the shift region 235. The stimulation dose is the result of summing the integrated stimulation intensities to which each fixel in the shift region 235 is subject while scanning the four consecutive slices 207, 217, 219 and 221. In the example shown, in which the $3w_0$-diameter intensity contour just fits inside the object area 108, the uniformity of the stimulation dose across the width of the shift region is better than about 0.5%. Moreover, the stimulation dose to which the leakage area outside the object area is subject is so low that the maximum bleaching of the latent image in the leakage area is less than about 0.7%.

As a result of the above-described non-uniform intensity profile of the stimulation spot 114 centered in the object area 108, the intensity of the infra-red light stimulating each fixel, such as the fixel 211, of the latent image 103 progressively increases to a peak and then progressively decreases to zero as the pixel is stepped past the stimulation spot and object area when each slice is scanned. The sensor array 110 successively generates image signals representing the intensity of the light emitted by the fixel in response to the intensity of the stimulation spot falling on the fixel at each step position of the x-y stage 104 in the y-direction that the fixel is inside the object area. Moreover, as a result of scanning the latent image 103 in slices shifted from one another in the x-direction by a shift amount equal to the fraction 1/n of the width of the slices, the intensity of the stimulation of each fixel in the latent image cycles as described above n times. When, while scanning the latent image, the position of the latent image relative to the object area is such that the fixel is located in the object area, each frame of image signals that the sensor array feeds to the image processor includes an image signal representing the intensity of the light emitted by the fixel in response to the stimulation spot 114. To determine the total light output emitted by the fixel in response to the stimulation dose given by the stimulation spot while scanning four consecutive slices, the image processor accumulates all the image signals generated by the sensor array in response to light emitted by the fixel.

An example of how the image processor 130 generates a picture signal representing the total light emitted by each fixel in the latent image 103 in response to the stimulation spot 114 while scanning the latent image will now be described with reference to FIGS. 3A–3L. To simplify the explanation, FIGS. 3A–3L show the small latent image 303 scanned by the simplified sensor array 310. The simplified sensor array is composed of a two-dimensional array of 4×4 pixels arranged in columns p–s and rows 0–3.

An optical system similar to the lens 106 shown in FIG. 1 forms a magnified image of a small part of the latent image 303 on the simplified sensor array 310. This defines the object area 308 in the latent image 303. The object area has a two-dimensional array of 4×4 fixels arranged in columns P–S and rows 0–3. The fixels include the example fixel 331 at column D, row 0, or position D0, of the latent image. Scanning the entire area of the latent image with the object area defines fixels in the latent image. In this example, these fixels are arranged in a two-dimensional array of 7×10 fixels arranged in columns A–G and rows 0–9. To simplify the drawings of FIGS. 3A–3L, the optical system is omitted and the object area is shown as having the same size as the sensor array to show the correspondence between the fixers of the object area and the pixels of the sensor array.

The stimulation spot 314 is centered in the object area 308. The figures all show the $w_0$ intensity contour and the $3w_0$-diameter intensity contour that just fits inside the object area 308. However, to simplify the drawings, the $w_0$ intensity contour and the $3w_0$-diameter intensity contour are indicated by reference numerals in FIG. 3A only.

In the practical embodiment of the scanner 100 shown in FIG. 1, the sensor array 110 preferably operates in a time delay and integration (TDI) mode to reduce the processing performed by the image processor 130. The following detailed explanation of the how the picture signals are derived from the image signals generated by the sensor array will also describe the simplified sensor array 310 operating in its TDI mode. When operating in its TDI mode, the simplified sensor array employs the bottom horizontal output register 368 and the top horizontal output register 370. Each horizontal output register is a linear array of signal storage elements p–s, one storage element for each column of pixels. Each storage element receives the accumulated image signal that results from accumulating the image signals generated by the pixels in the respective column of the sensor array. The sensor array operates bidirectionally, so that either the bottom horizontal output register 368 or the top horizontal output register 370 receives the image signals, depending on the state of a control signal (not shown) that controls the direction of operation. The horizontal output register that receives the image signals will be called the active horizontal output register.

The sensor array 310 operates in its TDI mode as follows. In response to the READ command signal, each pixel of the sensor array generates an image signal representing the time integral of the intensity of the light falling on the pixel. Then, at the trailing edge of the READ command signal, instead of feeding the image signal to the image processor 130 as one image signal in a frame of N image signals, where N is the number of pixels in the sensor array, the sensor array transfers the image signal to the adjacent pixel in the same column. The direction of the transfer is towards the active horizontal output register. Then, during the next cycle of the READ command signal, each pixel again generates an image signal and accumulates the newly-generated image signal with the image signal it received from the adjacent pixel at the end of the previous READ command signal cycle. However, no image signal accumulation occurs in the pixel in each column farthest from the active output register because these pixels do not receive an image signal from an adjacent pixel. Also on the trailing edge of each READ command signal, the image signal accumulated in the pixel in each column closest to the active horizontal output register is transferred to the respective element of the active horizontal output register. The image signal transferred to the active horizontal output register is an accumulation of the image signals generated by all m pixels in the column of the sensor array in m consecutive cycles of the READ command signal, where m is the number of rows of pixels in the sensor array.

For example, when the bottom horizontal output register 368 is the active horizontal output register, the image signals from the pixels p3, p2 and p1 in column p are respectively transferred to the pixels p2, p1 and p0 at the trailing edge of a fourth cycle of the READ command signal. No accumulation takes place in the pixel p3, farthest from the bottom horizontal output register. The image signal from the pixel p0, which is an accumulation of the image signals generated by the pixels p3, p2, p1 and p0 in the first through fourth cycles of the READ command signal, is transferred to the element p of the bottom horizontal output register. When the top horizontal output register 370 is the active horizontal output register, the image signals from the pixels p0, p1 and p2 are respectively transferred to the pixels p1, p2 and p3 at the trailing edge of a fourth cycle of the READ command signal. No accumulation takes place in the pixel p0, farthest from the top horizontal output register. The image signal from the pixel p3, which is an accumulation of the image signals generated by the pixels p0, p1, p2 and p3 in the first through fourth cycles of the READ command signal, is transferred to the element p of the top horizontal output register 370.

The pixel-to-pixel transfers of image signals in each column of the sensor array 310 are performed synchronously with, and in the same direction as, the x-y stage stepping the latent image 303 in the y-direction. This means that the image signal that progressively accumulates in the pixels of each column of the sensor array is generated in response to the light emitted by the same fixel of the latent image. Accordingly, when operated in its TDI mode, the sensor array automatically generates accumulated image signals by accumulating in the y-direction the image signals generated by the pixels in each column of the sensor array in response to the light emitted by each fixel of the latent image. This simplifies operation of the image processor 130, since, to accumulate all the image signals generated by the sensor array in response to the light emitted by each fixel in the latent image, the image processor need only perform processing to accumulate the n accumulated image signals generated by the sensor array in response to the light emitted by the fixel while scanning n overlapping slices.

In response to the trailing edge of the READ command signal, the sensor array 310 feeds a line of accumulated image signals from the active horizontal output register 368 or 370 to the image processor 130. As noted above, each of the accumulated image signals is the result of accumulating the image signals successively generated by all the pixels in the respective column of the sensor array in response to one of the fixels in each of the columns P, Q, R, and S of the object area 308 of the latent image 303. The sensor array generates the image signals as the position of the latent image is stepped relative to the object area. In the example shown, each line of accumulated image signals is composed of four accumulated image signals, each resulting from accumulating the image signals generated in one column of the sensor array 310. In the scanner 100 shown in FIG. 1, each line of accumulated image signals is composed of 256 accumulated image signals, each resulting from accumulating the image signals generated in one column of the sensor array 110.

The accumulated image signals generated by the sensor array 310 are fed from the active horizontal output register 368 or 370 via an ADC (not shown) to the image processor 130. The ADC converts the accumulated image signals to digital form.

FIGS. 3A–3L also show parts of the image processor 130. These parts include the picture memory 356. At least part of the picture memory is provided by part of the memory 142 shown in FIG. 1. The picture memory 356 is composed of one memory element for each fixel of the latent image. To simplify the following description, the memory elements of the picture memory are shown arranged in a two-dimensional 7×10 array of columns a–g and rows 0–9 corresponding to the arrangement of fixels in the latent image. The memory elements of the picture memory are shown arranged in a two-dimensional array merely to simplify the description: in a practical embodiment, any arrangement of memory elements corresponding in number to the fixels in the latent image can be used. The number of bytes in each memory element of the picture memory 356 depends on the precision of luminance and chrominance representation required. For example, a 24-bit color system would require three bytes per memory element.

In a practical example of the scanner 100 shown in FIG. 1, in which the latent image is composed of 3072×2048 fixels, the picture memory 356 would include about 6.3 million memory elements for each latent image scanned. This size of picture memory is most economically provided by the mass-storage device 134. However, the operational speed of the image processor 130 is increased if part of the picture memory resides in the memory 142. The part of the picture memory that best resides in the memory 142 is the part of the picture memory subject to arithmetic operations, i.e., the memory elements corresponding to the fixels in the currently-scanned slice. In the scanner 100 shown in FIG. 1, in which each slice is 256 fixels wide×2048 fixels long, only 256×(2048+255)=589,568 memory elements of the picture memory 356 need reside in the memory 142. After each slice has been scanned, 64×(2048+255)=147,392 picture signals accumulated in the memory 142 are then written to the mass-storage device 134 as a section of the picture signals representing the latent image, as will be described in more detail below.

Another part of the image processor 130 shown in FIG. 3A–3L is the accumulator 358. The accumulator receives the line of accumulated image signals from the sensor array 310 and the picture signals corresponding to the accumulated image signals from the picture memory 356, and adds the accumulated image signals to the respective picture signals to generate respective accumulated picture signals. The image processor 130 then returns the accumulated picture signals to the picture memory, where they are stored. In the scanner 100 shown in FIG. 1, the CPU 132 is programmed to operate with the memory 142 to perform the function of the accumulator. However, specialized hardware or firmware can alternatively be used to provide the function of the accumulator.

The process of scanning the small latent image 303 using a simplified sensor array 310 will now be described in detail with reference to FIGS. 1, 3A–3L and 5. In particular, the processing performed by the image processor to generate the picture signals for the fixel 311 while scanning four consecutive slices of the latent image will be described.

Figure 3A:
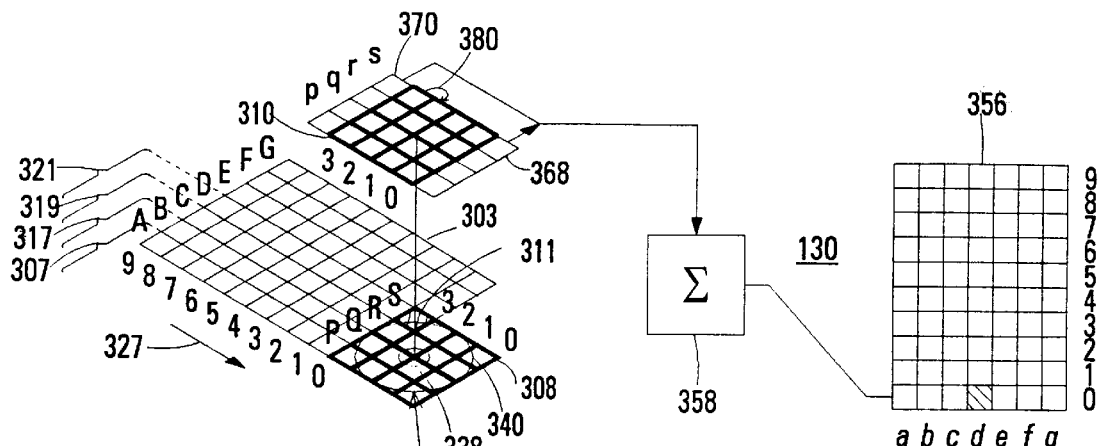
FIGS. 3A–3L illustrate an example of how the image processor processes the image signals generated by a simplified sensor array to generate a picture signal representing the total light emitted by each fixel of a small latent image in response to the stimulation spot when the latent image is scanned.

FIG. 3A shows the location of the active area 308 and the stimulation spot 314 part-way through scanning the latent image 303. Three previous slices have already been scanned. Scanning the first slice 307 read only the fixels in column A of the latent image, scanning the second slice 317 read the fixels in columns A and B, and scanning the third slice 319 read the fixels in columns A, B, and C. The active area and stimulation spot are shown in FIG. 3A in the first step of scanning the fourth slice 321, in which the fixels in columns A, B, C and D are read.

In the first step of scanning the fourth slice 321, only the pixels p3–s3 of the sensor array 310 are aligned to receive the light emitted by the fixers of the latent image 303. The pixels p3–s3 are aligned to receive the light respectively emitted by the fixels A0–D0 of the latent image and generate respective image signals representing the intensity of the light emitted by these fixels.

At the end of the first step, the image signals accumulated in the pixels p3–s3 are transferred to the pixels p2–s2, respectively, as indicated by the arrow 380.

Figure 5:
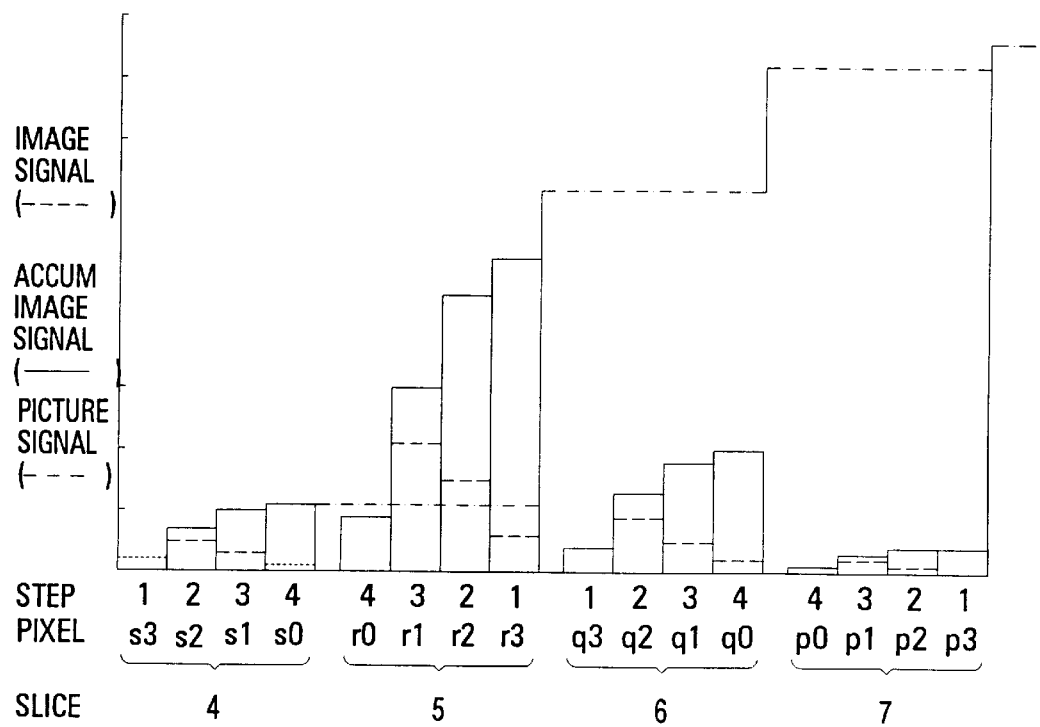
FIG. 5 is a graph illustrating how successive image signals generated in response to light emitted by a fixel of the small latent image are accumulated to generate the accumulated image signal and the picture signal.

FIG. 5 shows an example of the levels of the image signals (broken line) generated by the pixels of the sensor array 310 in response to the light emitted by the fixel 311 in each of the 16 steps in which a pixel of the sensor array generates an image signal in response to the light emitted by the fixel 311. The pixel generating the image signal is also indicated. FIG. 5 also shows the level of the image signal as it successively accumulates in each column of pixels of the sensor array that receives light emitted by the fixel 311 while scanning the fourth through seventh slices of the latent image 303 (solid line). Finally, FIG. 5 shows the level of the picture signal stored in the memory element d0 of the picture memory 356 as the picture signal accumulates while scanning the fourth through seventh slices (dash-dot line).

Because of the low level of infra-red stimulation to which the pixel 311 is subject in the first step of scanning the fourth slice, the image signal generated by the pixel p3 in the first step of scanning the fourth slice is close to zero, as shown. The image signal accumulated in the pixel p3 for the fixel 311 at the end of the fourth step has the same level as the image signal itself because the pixel p3 receives no image signal from an adjacent pixel. As noted above, the image signal accumulated in the pixel p3 is transferred to the pixel p2 at the end of the first step.

No picture signal is generated for the fixel 311 until the end of the fourth step, so the picture signal has a value of zero at the end of the first step.

Figure 3B:
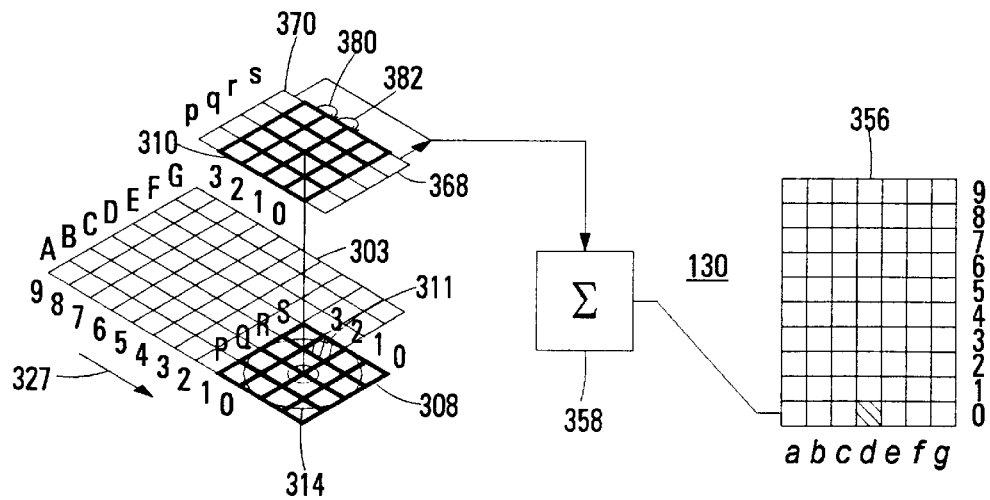

FIG. 3B shows the second step of scanning the fourth slice. In this, the latent image 303 is shifted by a distance corresponding to the height of one fixel in the −y-direction, as indicated by the arrow 327. The pixels p2–s2 of the sensor array 310 are now aligned to receive light respectively emitted by the fixels A0–D0 of the latent image. The pixels p2–s2 generate image signals representing the intensity of light emitted by these fixels, and accumulate these image signals with the image signals respectively received from the pixels p3–s3. The pixels p3–s3 of the sensor array are now aligned to receive light respectively emitted by the fixels A1–D1 of the latent image and generate image signals representing the intensity of the light emitted by these fixels.

At the end of the second step, the image signals accumulated in the pixels p2–s2 are transferred to the pixels p1–s1, respectively, as indicated by the arrow 382, and the image signals accumulated in the pixels p3–s3 are transferred to the pixels p2–s2, respectively, as indicated by the arrow 380.

Figure 3C:
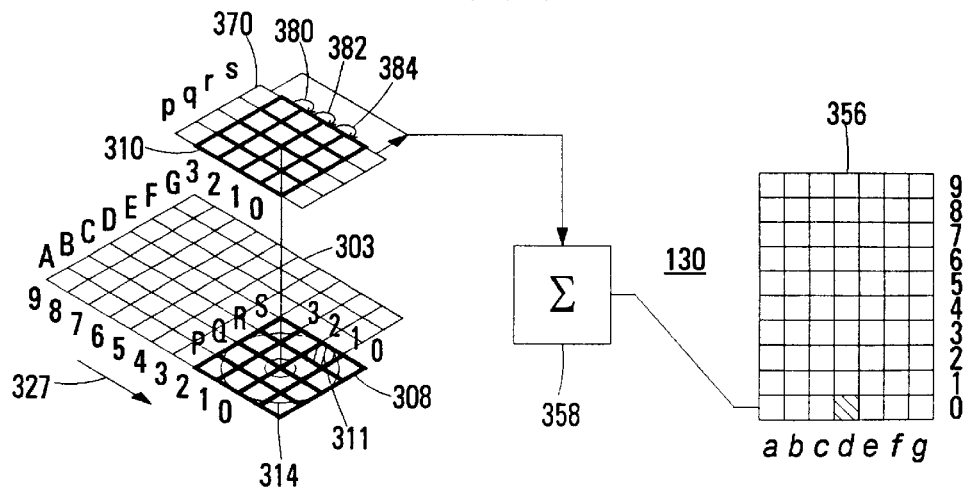

FIG. 3C shows the third step of scanning the fourth slice 321. In this, the latent image 303 is shifted by a distance corresponding to the height of one fixel in the −y-direction, as indicated by the arrow 327. The pixels p1–s1 of the sensor array 310 are now aligned to receive the light respectively emitted by the fixels A0–D0 of the latent image. The pixels p1–s1 generate image signals representing the intensity of the light emitted by these fixels, and accumulate these image signals with the image signals received from the pixels p2–s2, respectively. The image signals received from the pixels p2–s2 include the image signals transferred by the pixels p3–s3, respectively, at the end of the first step. Also, the pixels p2–s2 are now aligned to receive the light respectively emitted by the fixels A1–D1 of the latent image. The pixels p2–s2 generate image signals representing the intensity of the light emitted by these fixels and accumulate these image signals with the image signals received from the pixels p3–s3, respectively. Finally, the pixels p3–s3 are now aligned to receive the light respectively emitted by the fixels A2–D2 of the latent image and generate image signals representing the intensity of the light emitted by these fixels.

At the end of the third step, the image signals accumulated in the pixels p1–s1 are transferred to the pixels p0–s0, respectively, as indicated by the arrow 384, the image signals accumulated in the pixels p2–s2 are transferred to the pixels p1–s1, respectively, as indicated by the arrow 382, and the image signals accumulated in the pixels p3–s3 are transferred to the pixels p2–s2, respectively, as indicated by the arrow 380.

At the end of each of the above-described three steps of scanning the fourth slice 321, four image signals are transferred from the pixels p0--s0 of the sensor array 310 to the bottom horizontal output register 368. The bottom horizontal output register feeds a corresponding line of four image signals to the image processor 130. However, the image processor does not process these lines of image signals because the image signals are not the result of accumulating the image signals generated by all the pixels of each column of the sensor array in response to light emitted by the latent image. In the first step, for example, the pixels in rows 0, 1 and 2 do not receive light emitted by the latent image.

Figure 3D:
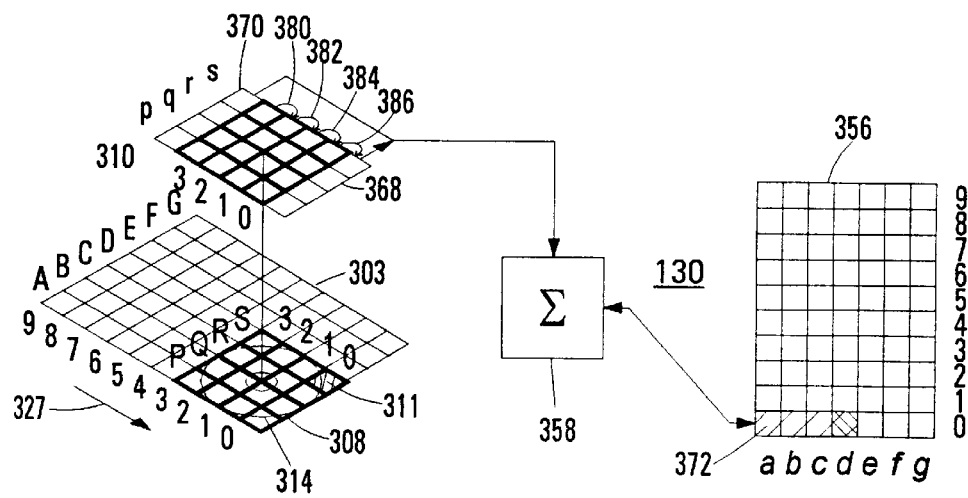

The fourth step of scanning the fourth slice 321 is shown in FIG. 3D. In this, the latent image 303 is shifted by a distance corresponding to the height of one fixel in the −y-direction, as indicated by the arrow 327. The pixels p0–s0 of the sensor array 310 are now aligned to receive the light respectively emitted by the fixels A0–D0 of the latent image. The pixels p0–s0 generate image signals representing the intensity of the light emitted by these fixels, and accumulate these image signals with the image signals received from the pixels p1–s1, respectively, at the end of the third step. The signals received from the pixels p1–s1 include the image signals transferred by the pixels p3–s3, respectively, at the end of the first step and the image signals transferred by the pixels p2–s2, respectively, at the end of the second step.

The pixels p1–s1 are now aligned to receive the light respectively emitted by the fixels A1–D1 of the latent image. The pixels p1–s1 generate image signals representing the intensity of the light emitted by these fixels, and accumulate these image signals with the image signals received from the pixels p2–s2, respectively, at the end of the third step. The signals received from the pixels p2–s2 include the image signals transferred by the pixels p3–s3, respectively, at the end of the second step.

The pixels p2–s2 are now aligned to receive the light respectively emitted by the fixels A2–D2 of the latent image. The pixels p2–s2 generate image signals representing the intensity of the light emitted by these fixels, and accumulate these image signals with the image signals received from the pixels p3–s3, respectively, at the end of the third step.

The pixels p3–s3 are now aligned to receive the light respectively emitted by the fixels A3–D3 of the latent image, and generate image signals representing the intensity of the light emitted by these fixels.

Also at the end of the fourth step, the image signals accumulated in the pixels p0–s0 are transferred to the bottom horizontal output register 368, as indicated by the arrow 386, the image signals accumulated in the pixels p1–s1 are transferred to the pixels p0–s0, respectively, as indicated by the arrow 384, the image signals accumulated in the pixels p2–s2 are transferred to the pixels p1–s1, respectively, as indicated by the arrow 382, and the image signals accumulated in the pixels p3–s3 are transferred to the pixels p2–s2, respectively, as indicated by the arrow 380.

The image signals transferred to the active horizontal output register, the bottom horizontal output register 368 in this case, will be called accumulated image signals because each of these signals is the result of accumulating the image signals generated by all the pixels of one column of the sensor array 310 in response to light emitted by one fixel. The bottom horizontal output register feeds a line of four accumulated image signals received from the pixels p0–s0 to the image processor 130. Since the accumulated image signals fed to the image processor 130 at the end of the fourth step are each the result of accumulating the image signals generated by all the pixels in one column of the sensor array, the image processor processes these accumulated image signals to generate picture signals.

As a result of the accumulation of image signals in the sensor array, each of the accumulated image signals fed to the image processor represents the total light emitted by the one fixel of the latent image whose light has been received by all the pixels in the respective column of the sensor array while scanning the current slice. For example, the four accumulated image signals fed to the image processor at the end of the fourth step of scanning the fourth slice respectively represent the total light emitted by the fixels A0, B0, C0 and D0 and received by all the pixels in the columns p, q, r, and s, respectively, of the sensor array while scanning the fourth slice. This is because light from only the fixels A0–D0 has been received by all the pixels in a respective column p–s of the sensor array at the end of the fourth step. In particular, the accumulated image signal generated as a result of accumulating the image signals generated by all the pixels in the column s of the sensor array and fed to the image processor from the element s of the bottom horizontal output register is the accumulated image signal for the fixel 311.

The way in which the image signal for the fixel 311 accumulates as it is transferred from pixel to pixel in column s of the sensor array 310 can be seen by the progressive increase in the level of the solid line in FIG. 5. When the fourth slice is scanned, the fixel 311 is located in the outer portion of the stimulation spot 114, and the level of infra-red stimulation to which the pixel 311 is subject is relatively low, especially in the first and fourth steps. As a result, the image signals generated for the fixel 311 in the first through fourth steps of scanning the fourth slice are close to zero, and the accumulated image signal for the fixel 311 transferred to the image processor at the end of the fourth step of scanning the fourth slice is also close to zero.

At the end of each step, except the first three, of scanning each slice of the latent image 303, a line of four valid accumulated image signals is fed to the accumulator 358 in the image processor 130. Then, while the x-y stage steps the latent image, the image processor 130 performs the processing that generates the picture signals corresponding to the accumulated image signals received from the sensor array by further accumulating the accumulated image signals generated for the respective fixels in scanning n consecutive overlapping slices.

The image processor 130 performs processing to generate the picture signals corresponding to the accumulated image signals received from the sensor array 310 at the end of every step by first retrieving from the memory 142 the object area position data indicating the position of the object area in the latent image. From the object area position data, the image processor determines memory location information indicating the locations in the picture memory 356 corresponding to the fixels of the latent image whose light emission is represented by the four accumulated image signals just received from the sensor array. The image processor transfers to the accumulator 358 the picture signals from the memory locations in the picture memory 356 indicated by the memory location information. The accumulator then adds the accumulated image signals just received from the sensor array to the respective picture signals received from the picture memory to generate accumulated picture signals. Finally, the image processor returns the accumulated picture signals from the accumulator to the respective memory locations in the picture memory whence the picture signals were originally transferred. The shaded area 372 indicates the memory locations in the picture memory where are stored the picture signals corresponding to the accumulated image signals fed to the image processor at the end of the fourth step.

The accumulated image signals fed to the image processor at the end of the fourth step of scanning the fourth slice include an accumulated image signal for the fixel 311. This accumulated image signal is the first accumulated image signal generated for the fixel 311. The first time an accumulated image signal is generated for a fixel, the accumulator 358 effectively stores the accumulated image signal in the picture memory 356 as the picture signal. This is because all memory elements of the picture memory are set to zero before scanning a latent image is begun, so the first time an accumulated image signal is generated for a fixel, the picture signal retrieved from the picture memory for the fixel has a value of zero. The accumulated picture signal that the accumulator returns to the picture memory has a value equal to that of the accumulated image signal.

Accumulated image signals are also generated at the end of the fourth step for the fixels A0–C0. Picture signals for these fixels have previously been stored in the picture memory because each of them has been read at least once when the first through third slices were scanned. Consequently, the accumulator 358 adds the accumulated image signals generated for these fixels at the end of the fourth step to the picture signals for these fixels already stored in the picture memory 356. At the end of the fourth step, the picture signals for the fixels A0, B0 and C0 are respectively the result of adding four, three, and two accumulated image signals. Since the picture signal for the fixel A0 at the end of the fourth step of scanning the fourth slice is the result of adding four accumulated image signals, this picture signal is the final picture signal for the fixel A0.

In the scanner 100 shown in FIG. 1, the accumulated image signal generated by the sensor array 110 for each fixel of the latent image 103 is the result of accumulating the image signals generated by all 256 pixels in the column of the sensor array that receives the light emitted by the fixel. However, as in the simplified example just described, four accumulated image signals for each fixel are added to generate the final picture signal for the fixel. Again, the initial picture signal is added with one accumulated image signal while scanning each of three consecutive slices.

To add the accumulated image signals to the respective picture signals, the image processor 130 first retrieves from the memory 142 the object area position data element indicating the location of the object area in the latent image 303. For example, the object area position data element may be the address of the fixel in the latent image 303 corresponding to the fixel P0 of the object are 308. From this, and information indicating the number of pixels in each row of the sensor array 310, the image processor determines the fixels of the latent image in response to which the sensor array generated the accumulated image signals just received by the image processor.

The object area position data can also be used to determine whether the accumulated image signals are valid, i.e., are the result of accumulating image signals generated by all the pixels in a column in response to light from the latent image. Valid accumulated image signals are only received when the object area is in a position in the latent image at which a pixel in the row of pixels adjacent the active horizontal output register 368 or 370 receives light from a fixel inside the latent image. The image processor can use this relationship to determine whether the accumulated image signals it receives at the end of each step of scanning each slice is valid.

In the fourth step of scanning the fourth slice 321, shown in FIG. 3D, the object area position data element indicates that the fixel P0 of the object area is located at the position of the fixel A0 of the latent image. Accordingly, the image processor determines that the sensor array 310 has generated the accumulated image signals just received in response to the light emitted by the fixels A0–D0 of the latent image. The image processor therefore transfers the picture signals of the fixels A0–D0 of the latent image from the picture memory 356 to the accumulator 358. These picture signals are transferred from the memory elements a0–d0 of the picture memory 356, indicated by the shaded area 372 in FIG. 3D. The accumulator adds the accumulated image signals received from the sensor array to the respective picture signals received from the picture memory to generate accumulated picture signals. The image processor then stores the accumulated picture signals back in the memory elements a0–d0 of the picture memory.

It should be noted that when the first three slices 307, 317 and 319 are scanned, the image processor is unable to retrieve picture signals corresponding to accumulated image signally generated in response to fixels located outside the latent image because memory locations corresponding to such accumulated image signals do not exist in the picture memory. The image processor discards accumulated image signals for which no corresponding memory locations exist in the picture memory 356.

To perform the accumulation processing just described, the image processor first transfers the picture signal stored in the memory element a0 of the picture memory to the accumulator 358. The accumulator then adds the accumulated image signal derived from the image signals generated by the pixels in column p of the sensor array to the picture signal to generate an accumulated picture signal. Finally, the image processor stores the accumulated picture signal back in the memory element a0 of the picture memory. This sequence is repeated three more times until accumulated picture signals for all the fixels A0–D0 are respectively stored in the memory elements a0–d0 of the picture memory.

The picture signal transferred to the accumulator 358 from the memory location d0 in the picture memory 356 has a value of zero in the fourth step of scanning the fourth slice shown in FIG. 3D because the accumulated image signal received in the fourth step of scanning the fourth slice for the fixel 311 at location D0 of the latent image is the first accumulated image signal received for this fixel. Hence, the accumulated picture signal stored back in the memory element d0 is equal to the accumulated image signal, as shown in the column marked slice 4, step 4 in FIG. 5.

Figure 3E:
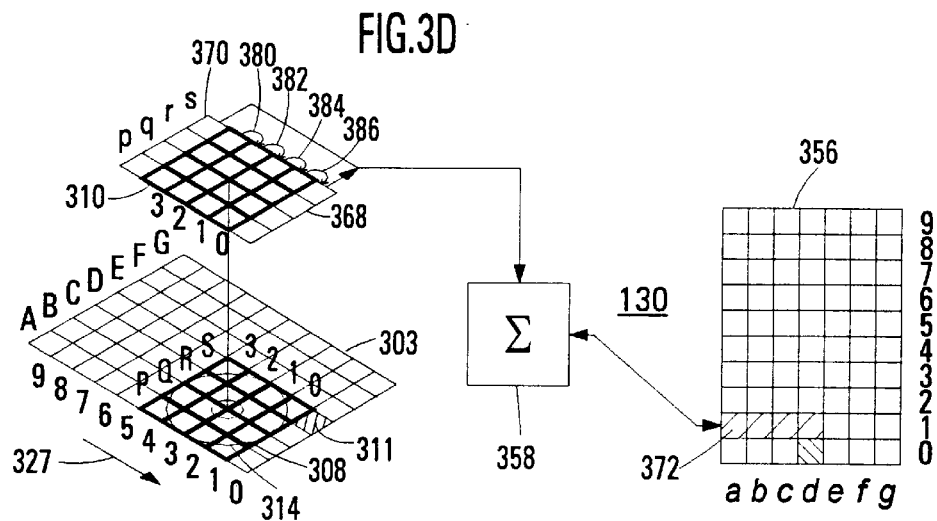
Figure 3F:
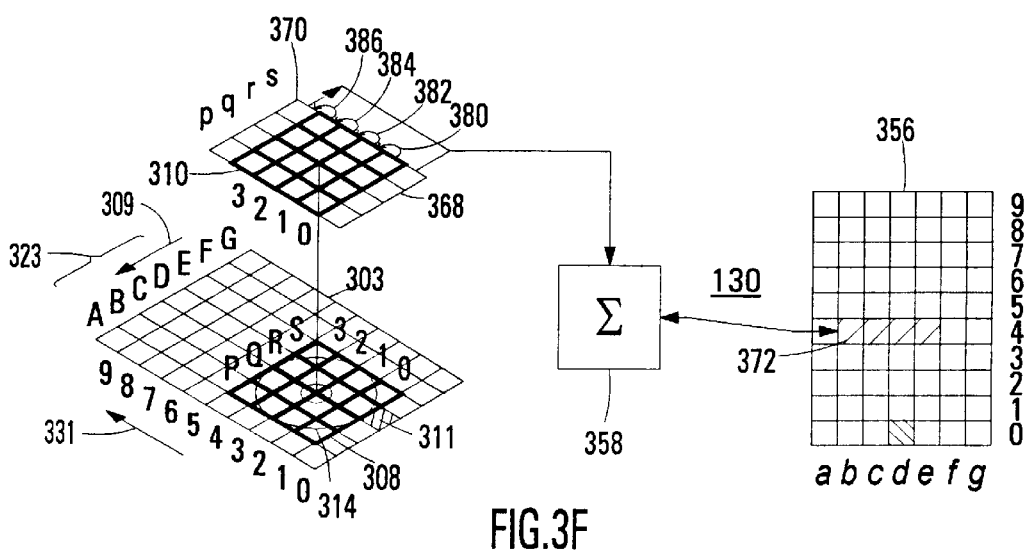
Figure 3G:
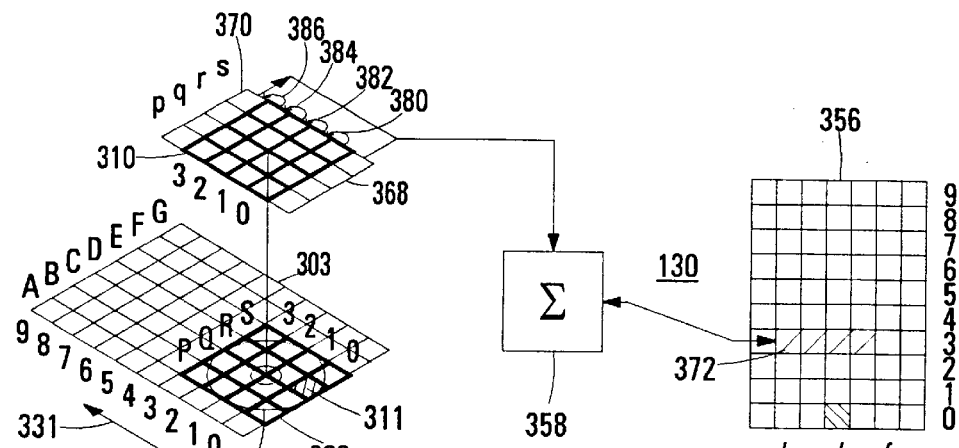
Figure 3H:
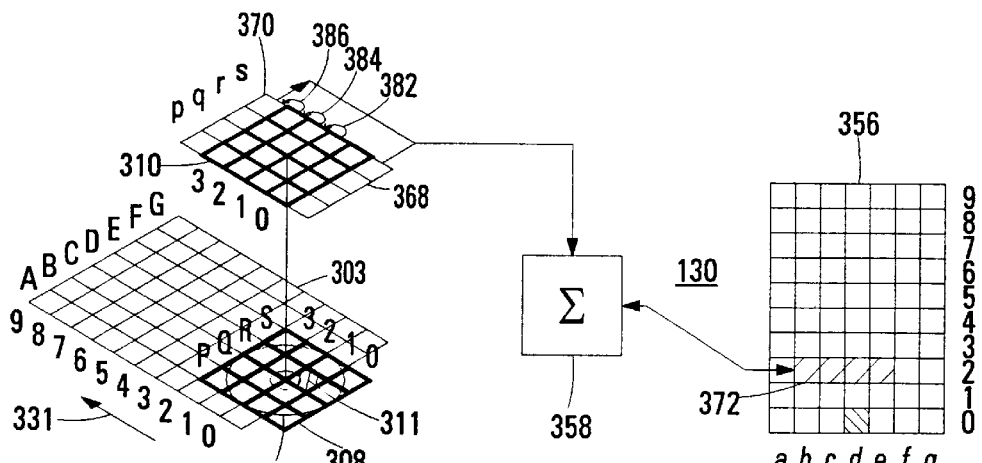
Figure 3I:
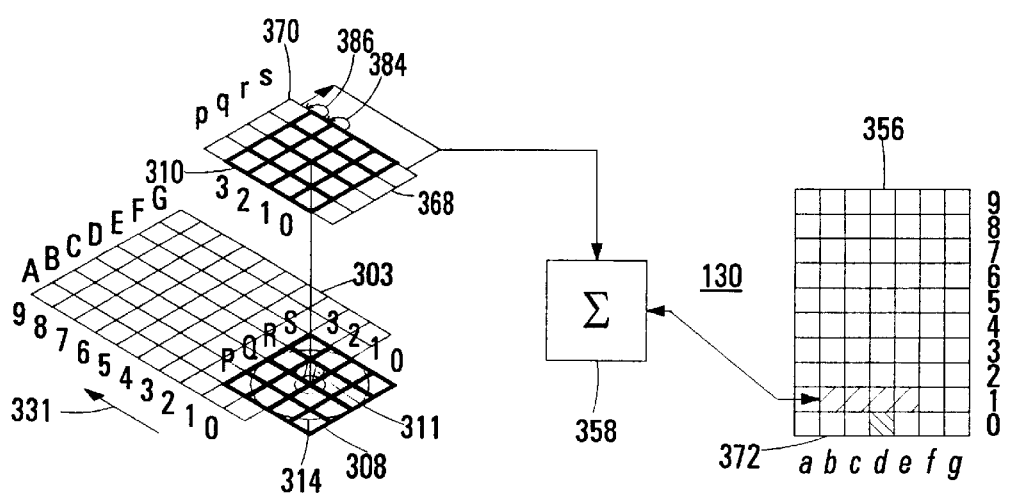
Figure 3J:
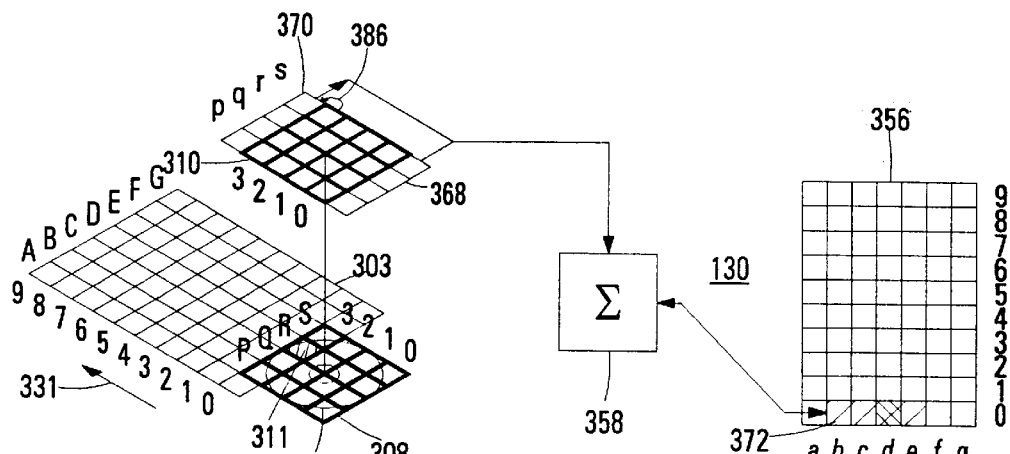

FIG. 3E shows the object area at the fifth step of scanning the fourth slice after the x-y stage has stepped the latent image 303 by a distance corresponding to the height of one fixel in the −y-direction, as indicated by the arrow 327. The pixels p0–s0 of the sensor array 310 are now aligned to receive the light respectively emitted by the fixels A1–D1 of the latent image. The pixels p0–s0 generate image signals representing the intensity of the light emitted by these fixers, and accumulate these image signals with the image signals received from the pixels p1–s1, respectively, at the end of the fourth step. The image signals received from the pixels p1–s1 include the image signals transferred by the pixels p2–s2, respectively, at the end of the third step and the image signals transferred by the pixels p3–s3, respectively, at the end of the second step.

The pixels p1–s1 are now aligned to receive the light respectively emitted by the fixels A2–D2 of the latent image. The pixels p1–s1 generate image signals representing the intensity of the light emitted by these fixels, and accumulate these image signals with the image signals received from the pixels p2–s2, respectively, at the end of the fourth step. The image signals received from the pixels p2–s2 include the image signals transferred by the pixels p3–s3, respectively, at the end of the third step.

The pixels p2–s2 are now aligned to receive the light respectively emitted by the fixels A3–D3 of the latent image. The pixels p2–s2 generate image signals representing the intensity of the light emitted by these fixels, and accumulate these image signals with the image signals received from the pixels p3–s3, respectively, at the end of the fourth step.

The pixels p3–s3 are now aligned to receive the light respectively emitted by the fixels A4–D4 of the latent image, and generate image signals representing the intensity of the light emitted by these fixels.

At the end of the fifth step, the image signals accumulated in the pixels p0–s0 are transferred to the bottom horizontal output register 368, as indicated by the arrow 386, the image signals accumulated in the pixels p1–s1 are transferred to the pixels p0–s0, respectively, as indicated by the arrow 384, the image signals accumulated in the pixels p2–s2 are transferred to the pixels p1–s1, respectively, as indicated by the arrow 382, and the image signals accumulated in the pixels p3–s3 are transferred to the pixels p2–s2, respectively, as indicated by the arrow 380. The bottom horizontal output register 368 feeds the four image signals it receives from the pixels p0–s0 to the image processor 130 as four accumulated image signals.

The four accumulated image signals fed to the image processor 130 at the end of the fifth step of scanning the fourth slice represent the total light emitted by the fixels A1–D1 and received by all the pixels in the columns p, q, r, and s, respectively, while scanning the fourth slice. This is because light from only the fixels A1–D1 has been received by all the pixels in a respective column p–s of the sensor array at the end of the fifth step.

At the end of the fifth step, the object area position data element indicates that the fixel P0 of the object area 308 is now located at the fixel A1 of the latent image 303. This indicates to the image processor 130 that the four accumulated image signals just received have been generated by the sensor array 310 in response to the light emitted by the fixels A1–D1 of the latent image. The image processor therefore transfers the picture signals of the fixels A1–D1 of the latent image from the picture memory 356 to the accumulator 358. These picture signals are transferred from the memory elements a1–d1 of the picture memory 356, as indicated by the shaded area 372. The accumulator adds the accumulated image signals just received from the sensor array to the respective picture signals received from the picture memory to generate accumulated picture signals. The image processor then stores the accumulated picture signals for the fixels A1–D1 back in the memory elements a1–d1 of the picture memory.

To perform the above processing, the image processor 130 first transfers the picture signal stored in the memory element a1 of the picture memory 356 to the accumulator 358. The accumulator then adds the accumulated image signal generated by accumulating the image signals generated by the pixels in column p of the sensor array to the picture signal to generate an accumulated picture signal. Finally, the image processor stores the accumulated picture signal for the fixel A1 back in the memory element a1 of the picture memory. This sequence is repeated three more times until accumulated picture signals for the fixels A1–D1 are respectively stored in the memory elements a1–d1 of the picture memory, indicated by the shaded area 372.

The picture signal transferred to the accumulator 358 from the memory location d1 in the picture memory 356 has a value of zero in the fifth step of scanning the fourth slice shown in FIG. 3E because the accumulated image signal generated in the fifth step of scanning the fourth slice for the fixel D1 of the latent image is the first accumulated image signal generated for this fixel. Hence, the accumulated image signal generated by the column s of the sensor array is effectively stored unchanged in memory element d1 of the picture memory 356 as the picture signal for the fixel D1.

After the fifth step of scanning the fourth slice 321 shown in FIG. 3E, the remainder of the fourth slice is scanned in eight further steps, steps six through 13. At the end of each of these steps, the bottom horizontal output register 368 feeds a line of four accumulated image signals to the image processor 130. The successive lines of accumulated image signals represent the total light emitted by the fixels A2–D2, A3–D3 . . . A9–D9 of the latent image 303.

The accumulated picture signal for the fixel 311 remains unchanged in the fifth through 13th steps of scanning the fourth slice 321 because, as can be seen in FIG. 3E, the fixel 311 is outside the object area 308 after the fifth step. However, in these steps, at least one accumulated image signal is added to each of the picture signals for the fixels A2 . . . C9 stored in the memory locations a2 . . . c9 of the picture memory 356, and initial picture signals for the fixels D2–D9 are stored in the memory locations d2–d9.

At the end of scanning the fourth slice 321, the picture signals for the fixels in the column D0–D9 of the latent image, including the picture signal for the fixel 311, have each been generated by accumulating in the y-direction the image signals successively generated by the pixels s3 . . . s0 of the sensor array 310 in consecutive steps of scanning the fourth slice and by storing the resulting accumulated image signal as a picture signal in the corresponding memory location in the picture memory 356.

At the end of scanning the fourth slice 321, the picture signals for the fixels in the column A0–A9 of the latent image 303 have each been generated by effectively accumulating 16 image signals in a two-step accumulation process. In the first accumulation step, which provides accumulation in the y-direction, the sensor array 310 generates an accumulated image signal for each fixel in the column when each of the slices one through four is scanned. The sensor array generates each accumulated image signal by accumulating the four image signals successively generated by all the pixels in one column of the sensor array. Then, in the second accumulation step, which provides accumulation in the x-direction, the image processor 130 adds the four accumulated image signals generated for the fixel in the first step to generate the final picture signal for the fixel.

The picture signals stored in the memory elements a0 . . . a9 of the picture memory 356 will not be further changed when the fifth and subsequent slices are scanned because the fixels A0 . . . A9 of the latent image will be outside the object area 308 when these slices are scanned, as shown in FIGS. 3F–3J. Thus, the accumulated picture signals stored in the memory elements a0 . . . a9 of the picture memory are the final picture signals for the fixels A0 . . . A9 of the latent image. These final picture signals can be left in the picture memory portion of the memory 142 until final picture signals for all fixels in the latent image have been generated. Alternatively, the final picture signals for the fixels A0 . . . A9 of the latent image can be copied from the memory elements a0 . . . a9 of the picture memory to corresponding elements of the mass-storage device 134. This frees the memory elements a0 . . . a9 of the picture memory portion of the memory 142 to be used, after their contents are reset to zero, for accumulating the picture signals for the fixels E0 . . . E9 that will be read for the first time when the fifth slice 323 is scanned.

FIGS. 3F–3J respectively show the locations of the object area 308 in the fifth through first steps of scanning the fifth slice 323 of the latent image 303. At the end of the scanning the fourth slice, the x-y stage (not shown) moves the latent image in the −x-direction by a distance equal to the width of one fixel, as indicated by the arrow 309. Scanning the fifth slice reads the fixels in columns B, C, D and E of the latent image. To scan the fifth slice, the x-y stage moves the latent image in the opposite (+y) direction to that in which it moved the latent image to scan the fourth slice, as indicated by the arrow 331.

When the fifth slice 323 and the other odd-numbered slices are scanned, the x-y stage (not shown) moves latent image 303 in the opposite direction to when the even-numbered slices are scanned, and the direction of the image signal transfers in the sensor array 310 is opposite to that of the image signal transfers when the even-numbered slices are scanned. This change in the transfer direction enables the image signals to track the motion of the fixels in response to which the image signals are generated. When the odd-numbered slices are scanned, the image signals are transferred towards the top horizontal output register 370. The top horizontal output register feeds lines of four accumulated image signals derived from the image signals that accumulate in the respective columns of the sensor array to the accumulator 358 in the image processor 130.

In the 13th through sixth steps (not shown) of scanning the fifth slice, the fixels in columns B–E and in rows 9; 9 and 8; 9, 8 and 7; 9, 8, 7 and 6; 8, 7, 6 and 5; 7, 6, 5 and 4; 6, 5, 4 and 3; and 5, 4, 3 and 2, respectively, of the latent image 303 are read. In the fifth step of scanning the fifth slice, shown in FIG. 3F, the fixels in columns B–E and rows 4, 3, 2 and 1 of the latent image are read. At the end of each step, the top horizontal output register 370 feeds a line of four accumulated image signals to the image processor 130. The image processor discards the lines of accumulated image signals it receives at the end of the 13th though 11th steps. These accumulated image signals are invalid because they are the result of accumulating at least one image signal generated in response to a fixel located outside the latent image 303. The fixel 311 remains unread in the 13th through fifth steps of scanning the fifth slice 323 because the fixel 311 is outside the object area 308.

At the end of the fifth though first steps of scanning the fifth slice, shown in FIGS. 3F–3J, the accumulator 358 adds the accumulated image signals received from the top horizontal output register 370 to the picture signals respectively retrieved from the memory elements b4–e4, b3–e3, b2–e2 ,b1–e1, and b0–e0 of the picture memory 356. These memory elements are indicated by the shaded area 372 in FIGS. 3F–3J. The picture signals stored in the memory elements of columns b–d of the picture memory are added to the corresponding accumulated image signals and the resulting accumulated picture signals are stored back in the same memory locations in the picture memory. Since the accumulated image signals generated for the fixels E9–E0 when the fifth slice is scanned are the first accumulated image signals for these fixels, the picture signals transferred to the accumulator from the memory elements e9–e0 of the picture memory have a value of zero. Accordingly, the accumulated image signals for the fixels E9–E0 are effectively stored in the memory elements of column e of the picture memory as initial picture signals for these fixels.

In the fourth through first steps of scanning the fifth slice shown in FIGS. 3G–3J, the fixel 311 is inside the object area 308. At the end of each of these steps, the image signals respectively generated by the pixels r0–r3 of the sensor array 310 in response to light emitted by the fixel 311 in the fourth through first steps are accumulated as the image signals are sequentially transferred from pixel to pixel in column r, as indicated by the arrows 380, 382, 384 and 386. At the end of the first step, the image signal is transferred to the element r of the top horizontal output register 370, whence it is fed, as the accumulated image signal for the fixel 311, to the accumulator 358 in the image processor 130.

The accumulator 358 adds the accumulated image signal received from element r of the top horizontal output register 370 to the picture signal retrieved from the memory element d0 of the picture memory 356. This adds an accumulated image signal to the picture signal for the fixel 311 for the first time. The resulting accumulated picture signal for the fixel 311 is then returned to memory element d0 of the picture memory. Thus, at the end of the first step of scanning the fifth slice, the picture signal stored in the memory element d0 for the fixel 311 is the result of accumulating the eight image signals generated in response to the light emitted by the fixel 311 while scanning the fourth and fifth slices of the latent image.

Scanning the fifth slice 323 subjects the fixel 311 to stimulation by much higher intensities of infra-red light than scanning the fourth slice, especially in the seventh and sixth steps. Thus, as shown in FIG. 5, the image signals generated by the pixels of column r of the sensor array 310 in response to the light emitted by the fixel 311 when scanning the fifth slice are substantially greater than those generated by the pixels of column s when the fourth slice was scanned. At the end of the first step, the accumulated image signal (solid line), and the picture signal (dot-dash line) for the fixel 311 have significant levels. The image signal generated by the pixel r2 in response to light emitted by the fixel 311 in the second step is shown to be less than that generated by the pixel r1 in the third step because the infra-red light bleaches the fixel 311 when the fixel is read in the third step.

At the end of scanning the fifth slice 323, the picture signals for the fixels B0–B9 of the latent image 303 have each been generated by effectively accumulating 16 image signals generated by the pixels of the sensor array 310 in response to the light emitted by these fixels. The picture signals stored in the storage elements b0–b9 of the picture memory 356 will not be changed when the sixth and subsequent slices are scanned, because the fixels B0–B9 will be outside the object area 308. As described above, the picture signals stored in the memory elements b0–b9 are final picture signals and may be left in the picture memory portion of the memory 142 or may alternatively be transferred to the mass-storage device 134 to free the memory elements b0–b9 of the picture memory portion of the memory 142 to be reused to accumulate the picture signals for the fixels F0–F9 that will be read for the first time when the sixth slice 325 is scanned.

Figure 3K:
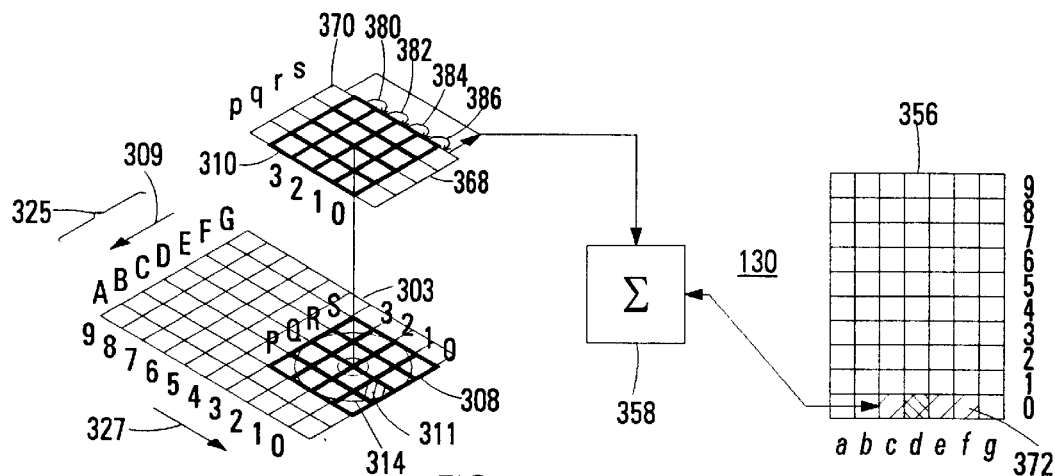
Figure 3L:
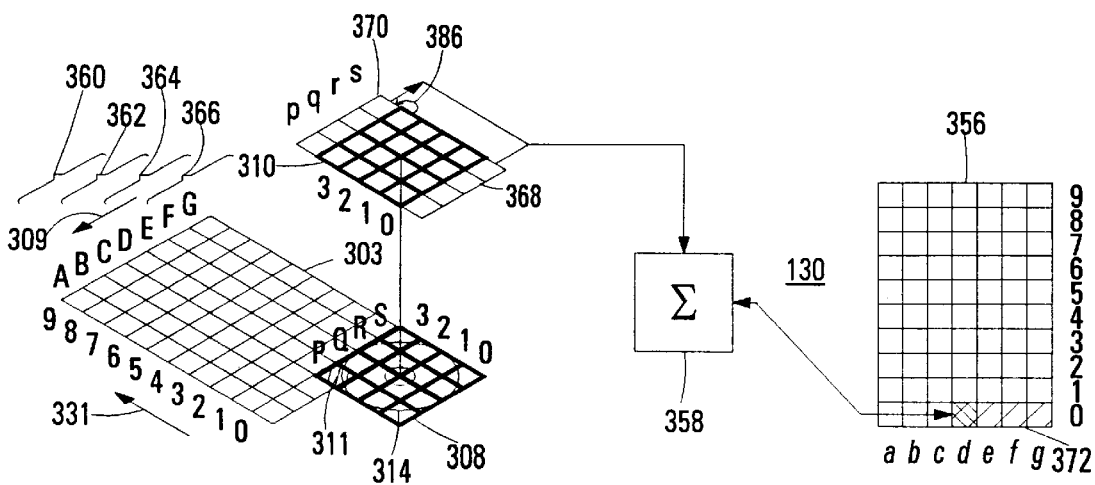

FIGS. 3K and 3L respectively show the location of the active area 308 in the fourth step of scanning the sixth slice 325 and in the first step of scanning the seventh slice 360 of the latent image 303. The final two accumulations of the picture signal for the fixel 311 are performed at the ends of each of these steps. Scanning the sixth slice reads the fixels in columns C, D, E and F of the latent image 303 in the same direction as the fourth slice 321, while scanning the seventh slice reads the fixels in columns D, E, F and G in the same direction as the fifth slice 323.

The fixel 311 is in the object area 308 in the first through fourth steps of scanning the sixth and seventh slices. Accordingly, when the sixth slice 325 is scanned, the image signals successively generated by the pixels q3–q0 of the sensor array 310 in the fourth through first steps are accumulated in the y-direction to generate an additional accumulated image signal for the fixel 311. This accumulated image signal is fed to the image processor 130 in a line of four accumulated image signals that also includes accumulated image signals for the fixels C0, E0 and F0. The accumulator 358 in the image processor adds the accumulated image signal for the fixel 311 to the picture signal for this fixel retrieved from the memory element d0 in the picture memory 356 and returns the accumulated picture signal to the memory element d0.

When the seventh slice 360 is scanned, the image signals successively generated by the pixels p0–p3 of the sensor array in the fourth through first steps are accumulated in the y-direction to generate a further additional accumulated image signal for the fixel 311. This accumulated image signal is fed to the image processor in a line of four accumulated image signals that also includes the accumulated image signals for the fixels E0–G0. The accumulator 358 in the image processor adds the accumulated image signal for the fixel 311 to the picture signal of the fixel 311 retrieved from the memory element d0 of the picture memory 356 and returns the resulting accumulated picture signal to the memory element d0.

Thus, at the end of the first step of scanning the seventh slice, the accumulated picture signals for the fixels D0–D9 of the latent image 303, including the picture signal for the fixel 311, have each been generated by effectively accumulating 16 image signals generated by the pixels of the sensor array 310 in response to the light emitted by these fixels. The picture signals stored in the storage elements d0–d9 of the picture memory 356 will not be changed when the sixth and subsequent slices are scanned, because the fixels D0–D9 will be outside the object area 308. As described above, the picture signals stored in the memory elements d0–d9 are final picture signals and may be left in the picture memory portion of the memory 142 or may alternatively be transferred to the mass-storage device 134. However, in this example, there is no need to free the memory elements d0–d9 of the picture memory portion of the memory 142 to be reused for accumulating the picture signals of other fixels of the latent image because no fixels are read for the first time after the sixth slice 325 has been scanned.

Scanning the sixth slice 325 subjects the fixel 311 to intensities of infra-red light comparable to those to which the fixel was subject when the fifth slice 323 was scanned. However, as shown in FIG. 5, the image signals generated by the pixels q3–q0 in response to light emitted by the fixel 311 when scanning the sixth slice are less than those generated by the pixels r0–r3 in response to light emitted by this fixel when the fifth slice was scanned because scanning the fifth slice bleaches the fixel 311. Also, the image signal generated by the pixel q1 in the third step of scanning the sixth slice is shown to be less than that generated by the pixel q2 in the second step of scanning the sixth slice because the fixel 311 is further bleached by the infra-red light in the second step.

Scanning the seventh slice 360 subjects the fixel 311 to intensities of infra-red light comparable to those to which the fixel was subject when the fourth slice 321 was scanned. Consequently, as shown in FIG. 5, the accumulated image signals generated when the seventh slice is scanned are all close to zero, (a) because of the low intensity of the infra-red stimulation, and (b) because the fixel 311 was bleached by the infra-red light when the previous slices were scanned.

FIG. 5 also shows that, at the end of scanning each of the sixth and seventh slices, the level of the picture signal (dot-dash line) for the fixel 311 is increased by the level of the accumulated image signal (solid line).

In the scanner 100 described above with reference to FIG. 1, the fixels are much smaller in relationship to the size of the stimulation spot 114 than in the simplified example just described. Each fixel in the scanner 100 is subject to a more gradual change in infra-red stimulation between successive steps of scanning each slice in the y-direction than in the simplified example. As a result, as shown in FIG. 4, the stimulation dose to which all the fixels are subject approximates more closely to a constant value in the scanner 100 than in the simplified example just described.

After the seventh slice 360 has been scanned, the eighth slice 362, the ninth slice 364 and the tenth slice 366 shown in FIG. 3L are scanned to generate the final picture signals for the remaining fixels of the latent image 303.

At the end of scanning the latent image 303, the final picture signals for the entire latent image may be transferred to the mass-storage device 134. If the image processor 130 includes the graphics adaptor 138 and/or the printer port 144, the picture signals may also be copied to these elements to enable the latent image reproduced from the storage phosphor to be displayed and/or printed.

As noted above, the number of bytes of the mass-storage device 134 required to store the picture signals representing the latent image 303 may be reduced by subjecting the picture signals to signal compression processing. This processing may be performed after the final picture signals have been generated for each macroblock of, for example, 16×16 fixels of the latent image. Alternatively, signal compression processing may be performed after the final picture signals have been generated for each slice, or after the final picture signals have been generated for the entire latent image, for example.

The sensor array may be operated in its normal frame mode instead of its TDI mode. In this case, the sensor array generates frames of 16 image signals at the end of each step of scanning the latent image, the image processor 130 must perform accumulation processing to generate the picture signal for each fixel in the latent image by accumulating all the image signals generated by the sensor array in response to light emitted by the fixel.

The invention has been described above with reference to the practical scanner 100 shown in FIG. 1, and the simplified scanner shown in FIGS. 3A–3L. However, the invention is not limited to these embodiments. For example, the storage phosphor need not be mounted in an x-y stage to change the position of the object area 108 and the stimulation spot 114 in the latent image 103. The storage phosphor may be static, and the infra-red source 120 and the sensor array 110 may be moved to scan the latent image. Alteratively, the storage phosphor, the sensor array and the infra-red source may all be static, and the latent image may be scanned by including one or more light deflecting elements in the optical paths between the object area and both the infra-red source 120 and the sensor array 110. As a further alternative, the latent image may be scanned by moving the latent image in a first direction, for example, the x-direction, and by moving the infra-red source 120 and the sensor array 110, or by deflecting the light in the optical paths to these elements, in a second direction, orthogonal to the direction.

The invention has been described with respect to the object area 108 and stimulation spot 114 moving relative to the latent image 103 in steps in the y-direction and in shift amounts in the x-direction. However, the invention is not limited to this, and the object area and the stimulation spot may move smoothly relative to the latent image. For example, the storage phosphor may be coated on a flexible backing similar to that used in conventional 35 mm film. The latent image may be advanced smoothly in the x-direction by means of its sprocket holes. In this case, the sensor array has to be skewed slightly about the optical axis of the lens to take account of the non-perpendicular relationship between the x-direction and the direction of the slices. Moreover, the object area and stimulation spot must retrace rapidly to the beginning of the slice if the latent image is scanned this way. Additionally or alternatively, the object area and stimulation spot may move smoothly in the y-direction.

In the above description, the slices are described as being scanned in the y-direction. However, the invention is not limited to this, and the slices may alternatively be scanned in the x-direction. Also, the even-numbered slices are described in the above description as being scanned with the storage phosphor moving in the −y-direction and odd-numbered slices being scanned with the storage phosphor moving in the +y-direction. However, these directions may be reversed, or, as noted above, the slices may be scanned in the +x-direction or the −x-direction only, with rapid retracing between the scans. Finally, the x-direction is shown aligned with the long direction of the latent image. However, the x-direction may be aligned with the short direction of the latent image, or the latent image may be square, and lack a long direction.

In the above examples, the sensor array 103 is described as being a square array of 256×256 pixels. However, the invention is not limited to this. Sensor arrays having different numbers of pixels, rectangular arrays of pixels, or even linear arrays of pixels may be used. Using a sensor array with more pixels increases the cost of the scanner, because the sensor array is more expensive and a larger, more expensive lens is required. However, a sensor array with more pixels reduces the time required to scan the latent image, and/or provides an increased spatial resolution. A sensor array with fewer pixels is less expensive but increases the time required to scan the latent image, and/or provides a decreased spatial resolution.

In the above description, the scanner is described as scanning a latent image stored in a storage phosphor with dimensions equivalent to conventional 35 mm photographic film. However, the invention is not limited to a scanner for scanning a latent image with such dimensions. The scanner according to the invention can easily be scaled to scan a latent image of any practical size simply by changing the mechanical scanning range and the size of the picture memory. Moreover, the preferred embodiment of the scanner is described as providing a spatial resolution similar to that of conventional 35 mm still photographic film. However, the invention is not limited to a scanner that provides such spatial resolution. The scanner according to the invention can easily be scaled to provide a range of spatial resolutions by changing the magnification produced by the lens 106, for example.

In the above description, the image processor 130 is described as having a structure based on the microprocessor 132. However, the invention is not restricted to such a structure. The functions performed by the image processor can be carried out using discrete or integrated circuits that perform such functions as accumulating image signals to generate the picture signals, storing the picture signals in a mass-storage device, deriving analog signals for feeding to a video monitor from the picture signals, generating command signals to control the operation of the sensor array and the x-y stage, tracking the location of the object area in the latent image, and compressing the picture signals. Moreover, analog image signals generated by the sensor array can be accumulated as analog image signals in both the x- and y-directions to generate respective accumulated analog picture signals that could be displayed on a video monitor and stored in an analog mass-storage device such as a video tape. Circuits for performing these functions are known in the art and will not be described here.

In the above description, the scanner is described as scanning a latent image stored in a storage phosphor. However, the scanner may additionally or alternatively be used to scan a non-latent image, such as an image stored in a conventional photographic film. To scan such a non-latent image, a visible light source is substituted for the infra-red source 120, and the non-latent image is scanned as described above. The visible light source may be a white light source, in which case, the picture signals for the non-latent image can be obtained in a single scan. Alternatively, the visible light source may be a colored light source. In this case, three scans of the non-latent image are required to generate the picture signals representing the non-latent image, with the color of the visible light source being different for each scan. Although the latter method is more time consuming, the processing required to extract the color information for the picture signals from the accumulated image signals is easier.

Although this disclosure describes illustrative embodiments of the invention in detail, it is to be understood that the invention is not limited to the precise embodiments described, and that various modifications may be practiced within the scope of the invention defined by the appended claims.

I claim:

1. A method of generating picture signals representing a stored image stored in an image storage medium, the method comprising steps of:

providing a sensor array including a rectangular array of pixels, each pixel generating an image signal in response to light;

providing a stimulation beam having a monotonic non-uniform intensity distribution;

forming an image of an object area of the stored image on the sensor array to define in the object area a fixel corresponding to each pixel of the sensor array, the object area being a small fraction of the area of the stored image and having a position relative to the stored image;

stimulating the stored image by forming a stimulation spot on the stored image using the stimulation beam, the stimulation spot being substantially centered in the object area;

scanning the stored image with the object area and the stimulation spot to define fixels in the stored image and to generate a picture signal for each fixel, the picture signal representing an accumulation of light emitted by the fixel in response to the stimulation spot, the step of scanning the stored image including steps of:

successively changing the position of the object area and stimulation spot relative to the stored image along a first axis to scan a slice of the stored image, scanning successive slices of the stored image along a second axis, orthogonal to the first axis, at each position of the object area in the stored image, controlling the sensor array to generate an image signal in response to the light emitted by each fixel in the object area, and for each fixel in the stored image, accumulating all the image signals generated by the sensor array in response to the light emitted by the fixel at each position of the object area in the stored image in which the fixel is inside the object area to generate the picture signal for the fixel.

2. The method of claim 1, in which:
in the step of forming an image on the sensor array, the object area has a width;
in the step of stimulating the stored image, the stimulation spot has an intensity, a peak intensity and a radius of $w_0$ at which the intensity is $e^{-2}$ of the peak intensity; and
the radius $w_0$ is about one third of the width of the object area.

3. The method of claim 1, in which:
in the step of forming an image on the sensor array, the object area has a width;
in the step of successively changing the position of the object area and the stimulation spot to scan a slice of the stored image, the slice has a width equal to the width of the object area; and
the step of scanning successive slices of the stored image includes a step of overlapping the slices by a slice overlap amount of at least one half the width of the slices.

4. The method of claim 3, in which the slice overlap amount is three fourths of the width of the slices.

5. The method of claim 1, in which, in the step of providing a stimulation beam having a monotonic non-uniform intensity distribution, a stimulation beam with a single Gaussian intensity distribution is provided.

6. The method of claim 1, in which, in the step of stimulating the stored image, the stimulation spot has an intensity of substantially zero outside the object area.

7. The method of claim 1, in which, in the step of providing a sensor array, a sensor array operating in a time delay and integration (TDI) mode is provided.

8. The method of claim 7, in which:
in the step of providing a sensor array, a sensor array is provided in which the pixels are arranged in a two-dimensional array of rows and columns and the columns are parallel to the first axis; and
the step of accumulating all the image signals to generate the picture signal for the fixel includes steps of:
accumulating, when each slice of the stored image in which the fixel lies inside the object area is scanned, all the image signals generated by the pixels in one column of the sensor array in response to the light emitted by the fixel in successive positions of the object area in which the fixel is inside the object area to generate an accumulated image signal for the fixel, and accumulating the accumulated image signals generated for the fixel to generate the picture signal for the fixel.

9. The method of claim 1, in which the step of accumulating all the image signals to generate the picture signal for the fixel includes a step of accumulating, when slices of the stored image in which the fixel is inside the object area are scanned, all the image signals generated by the sensor array in response to the light emitted by the fixel in successive positions of the object area and the stimulation spot in which the fixel is inside the object area to generate the picture signal for the fixel.

10. The method of claim 1, in which:
the method is for generating the picture signals representing a latent image stored in a storage phosphor; and
in the step of providing a stimulation beam, a stimulation beam of infra-red light is provided.

11. Apparatus for generating picture signals representing a stored image stored in an image storage medium, the apparatus comprising:

a sensor array including a rectangular array of pixel means for generating an image signal in response to light;

image forming means for forming an image of an object area of the stored image on the sensor array and for defining in the object area a fixel corresponding to each pixel means in the sensor array, the object area being a small fraction of the area of the stored image and having a position relative to the stored image;

stimulating means for stimulating the stored image with a stimulation beam having a monotonic non-uniform intensity distribution to form a stimulation spot substantially centered in the object area;

picture signal generating means for scanning the stored image to define fixels in the stored image and to generate a picture signal for each fixel, the picture signal representing an intensity of light emitted by the fixel in response to the stimulation beam, the picture signal generating means including:

position changing means for successively changing the position of the object area and stimulation spot relative to the stored image along a first axis to scan a slice of the stored image, and for scanning successive slices of the stored image along a second axis, orthogonal to the first axis, control means, operating at each position of the object area in the stored image, for controlling the sensor array to generate an image signal in response to the light emitted by each fixel in the object area, and accumulating means, operating for each fixel in the stored image, for accumulating all the image signals generated by the sensor array in response to the light emitted by the fixel at each position of the object area in the stored image in which the fixel is inside the object area to generate the picture signal for the fixel.

12. The apparatus of claim 11, in which:
the object area has a width; and
the stimulating beam has an intensity, a peak intensity, and a radius of $w_0$ at which the intensity is $e^{-2}$ of the peak intensity; and
the radius $w_0$ is about one third the width of the object area.

13. The apparatus of claim 11, in which:
the object area has a width;
the slices each have a width equal to the width of the object area; and the position changing means for scanning the stored image in slices that overlap by a slice overlap amount of at least one half the width of the slices.

14. The apparatus of claim 11, in which the slice overlap amount is three-fourths of the width of the slices.

15. The apparatus of claim 11, in which the stimulation beam has a single Gaussian intensity distribution.

16. The apparatus of claim 11, in which the stimulation spot has an intensity of substantially zero outside the object area.

17. The apparatus of claim 11, in which the sensor array includes a time delay and integration (TDI) sensor array.

18. The apparatus of claim 17, in which:

the pixel means of the sensor array are arranged in a two-dimensional array of rows and columns, the columns being parallel to the first axis; and the accumulating means includes:

columnar accumulating means, operating when the position changing means scans each slice of the stored image in which the fixel is inside the object area, for accumulating all the image signals generated by the pixel means in one column of the sensor array in response to the light emitted by the fixel in successive positions of the object area and stimulation spot in which the fixel is inside the object area to generate an accumulated image signal for the fixel, and slice-wise accumulating means for accumulating the accumulated image signals generated for the fixel by the columnar accumulating means to generate the picture signal for the fixel.

19. The apparatus of claim 11, in which the image processing means includes means, operating when the position changing means scans slices of the stored image in which the fixel is inside the object area, for accumulating all the image signals generated by the sensor array in response to the light emitted by the fixel in successive positions of the object area and the stimulation spot in which the fixel is inside the object area to generate the picture signal for the fixel.

20. The apparatus of claim 11, in which:

the apparatus is for generating the picture signals representing a latent image stored in a storage phosphor; and the stimulating means includes a source of infra-red light.

* * * * *